(12) United States Patent
Osminer et al.

(10) Patent No.: US 10,341,708 B2
(45) Date of Patent: *Jul. 2, 2019

(54) METHODS AND APPARATUS THAT FACILITATE CONTROLLING MULTIPLE DEVICES

(71) Applicant: Time Warner Cable Enterprises LLC, St. Louis, MO (US)

(72) Inventors: Matthew Osminer, Erie, CO (US); Ernest Joseph Biancarelli, Denver, CO (US); Craig Mahonchak, Broomfield, CO (US); Chris Williams, Chantilly, VA (US); Scott Ramsdell, Charlotte, NC (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/804,896

(22) Filed: Jul. 21, 2015

(65) Prior Publication Data

US 2015/0326908 A1 Nov. 12, 2015

Related U.S. Application Data

(63) Continuation of application No. 13/842,016, filed on Mar. 15, 2013, now Pat. No. 9,118,952.

(51) Int. Cl.
*H04N 21/41* (2011.01)
*H04N 21/4147* (2011.01)
(Continued)

(52) U.S. Cl.
CPC ....... *H04N 21/4131* (2013.01); *G08B 25/008* (2013.01); *H04N 7/183* (2013.01);
(Continued)

(58) Field of Classification Search
CPC ............... H04N 21/4131; H04N 7/183; H04N 21/4147; H04N 21/4227; H04N 21/4334; H04N 21/43615; G08B 25/008
(Continued)

(56) References Cited

U.S. PATENT DOCUMENTS

2004/0186739 A1* 9/2004 Bolles ............... G08B 13/19656
340/506
2006/0098946 A1* 5/2006 Park ..................... G11B 27/034
386/230

(Continued)

*Primary Examiner* — Mishawn N. Hunter
(74) *Attorney, Agent, or Firm* — Straub & Straub; Michael P. Straub; Stephen T. Straub

(57) ABSTRACT

Methods and apparatus for controlling a home alarm and supporting various control functions including STB recording functions are described. In some embodiments, e.g., where the STB is a DOCSIS capable device, communications between the control panel and STB is through a gateway and/or server which allow the IP based control panel to interact with the STB via a communications network and other devices located external to the customer premise where the control panel is located. In embodiments where the STB supports IP capability, communication between the control panel and STB is via a home network. In some embodiments upon selecting an alarm activation option a user is provided an opportunity to select at least one of: recordings, which are scheduled for deletion, to be preserved, or suggestions for programs for recording. Upon alarm deactivation, a list of new recordings made in user's absence and a missed call log is presented.

19 Claims, 14 Drawing Sheets

(51) Int. Cl.
*H04N 21/478* (2011.01)
*H04N 21/433* (2011.01)
*H04N 21/472* (2011.01)
*H04N 21/4227* (2011.01)
*H04N 21/436* (2011.01)
*H04N 7/18* (2006.01)
*G08B 25/00* (2006.01)
*G08B 25/14* (2006.01)

(52) U.S. Cl.
CPC ..... *H04N 21/4147* (2013.01); *H04N 21/4227* (2013.01); *H04N 21/4334* (2013.01); *H04N 21/43615* (2013.01); *H04N 21/478* (2013.01); *H04N 21/47214* (2013.01); *G08B 25/14* (2013.01)

(58) Field of Classification Search
USPC .................................. 386/226, 296; 340/540
See application file for complete search history.

(56) References Cited

U.S. PATENT DOCUMENTS

| | | | | |
|---|---|---|---|---|
| 2007/0098370 A1* | 5/2007 | Wells | ....................... | H04N 5/76 386/331 |
| 2009/0181640 A1* | 7/2009 | Jones | ................... | G08B 13/196 455/404.2 |
| 2010/0092160 A1* | 4/2010 | Bhogal | ................ | G11B 27/034 386/241 |
| 2011/0030016 A1* | 2/2011 | Pino, Jr. | .............. | H04L 12/2818 725/80 |
| 2013/0147623 A1* | 6/2013 | Somasundaram | ..... | G08B 21/00 340/540 |
| 2013/0332953 A1* | 12/2013 | Howcroft | ........... | H04N 21/4334 725/34 |

* cited by examiner

METHODS AND APPARATUS THAT FACILITATE CONTROLLING MULTIPLE DEVICES

RELATED APPLICATIONS

The present application is a continuation of U.S. patent application Ser. No. 13/842,016 filed December Mar. 15, 2013 entitled "METHODS AND APPARATUS THAT FACILITATE CONTROLLING MULTIPLE DEVICES" which is hereby expressly incorporated by reference in its entirety.

FIELD

Various embodiments of the present invention are related to home control systems, and more particularly, to method and apparatus that allow a user to control multiple devices, e.g., a video recording device, alarm, lights, etc., located at a customer premise using a single control device, e.g., a control panel.

BACKGROUND

Control panels and IP based control systems have been growing in popularity. Via such systems a user may be able to control a home alarm and/or other devices which are capable of supporting Internet Protocol (IP) based communications. The same devices may also be controlled in some cases remotely via an Internet interface and a mobile device capable of supporting IP communications such as a smart cell phone and/or other mobile device capable of supporting IP communications.

While the control of IP capable devices is relatively straight forward via an IP capable communications device, whether that be a control panel or smart phone, and an Internet server or home network. While many new set top boxes are IP capable, there remains a vast number of set top boxes, e.g., set top boxes which support digital video recording (DVR) functionality, which rely on non-IP signaling for control and communications purposes, based on one or more CableLabs specifications sometimes referred to as DOCSIS specifications.

In view of the above, it should be appreciated that there is a need for methods and/or apparatus that allow a user of a set top box (STB) with digital video recorder (DVR) capability to control and/or interact with the STB whether it be IP based or uses some other type of signaling, e.g., DOCSIS bases signaling for control and/or communications purposes.

In addition to allowing control of a STB from a control panel or other device, there is a need for improved methods and/or apparatus which allow a user to control multiple home devices in a simplified manner with a single command controlling multiple devices and/or initiating multiple operations. In view of the above, it should be appreciated that there is a need for methods and apparatus which allow STBs as well as other home devices such as a home security alarm, to be controlled from a single convenient control panel or device regardless of whether the STB supports IP signaling or some other communications protocol.

SUMMARY

Methods and apparatus which facilitate controlling of multiple user devices, e.g., devices located at a customer premise, e.g., home, using a single interface, e.g., such as an interface on a control panel, an IP device and/or a Smartphone, are described.

Various embodiments and features relate to providing new and useful features allowing a user to control a STB from the same control panel a user can use to control a home alarm and/or other device in the house. Control of multiple devices through a single user input, e.g., a multifunction alarm activation and home device control button or other user selectable control, are described. In accordance with various features, a user can, e.g., when leaving home, activate a home alarm, automatically be presented with various DVR related control options, and shut down various home devices by making a single user selection on a control panel. In some embodiments, once selecting the multifunction alarm activation control option, the control device, e.g., control panel, initiates retrieval about recording which are scheduled to be deleted in the near future, presents the user an opportunity to select one or more of the recording scheduled to be deleted to be preserved, and/or presents the user with suggestions for programs which the user may want to select for recording while away from home.

Upon return home, in some embodiments, in response to a user selecting a multi-function alarm deactivation control option, e.g., button or icon on a control panel, the home alarm is deactivated, various devices are activated, e.g., the lights and TV are turned on, and the user is presented with information about what recordings where made since the time of alarm activation. The user is presented an opportunity to select one or more of the recordings made during the user's absence from the home for immediate playback. In addition to being presented recording information, upon returning home a user may be presented with call logs and/or message information with the user being able to select from the call or message log to access call information and/or voicemails directly from the control panel which can also be used to control the home alarm system and STB.

In various embodiments, control of a STB is supported even in cases where the STB is not IP capable. In the case of IP capable devices, communication with the STB may, and in some embodiments does, occur between the STB and IP capable STB via a home network. In embodiments where the STB is not IP capable, i.e., uses DOCSIS signaling for control and information transfer purposes, the control panel communicates, via a network connection which extends outside the home, with a gateway device and/or server, e.g., in a cable headend, which can communicate with the STB in the user's home via DOCSIS signaling. The response from the STB to the control panel is communicated from the STB via the external network including the gateway, to the control panel. The gateway and/or server external to the home provide communications protocol conversion, security and/or other functions which allow the non-IP capable STB to be controlled from the control panel. From the perspective of the non-IP capable STB, the control signaling appears to be with an element in the network headend while the control is actually being initiated from the non-DOCSIS, e.g., IP based, control panel located at the customer premise location, e.g., home.

The control panel may, and in some embodiments is, configured to interact with the STB with recording capability via the home network when the STB supports IP based communications and through the external gateway and server when the STB does not support IP based communications. Control panel configuration may, and in some embodiments is, remotely controlled and configured from the network headend of the video server provider which provides content to the STB. Thus the cable network headend and/or other service provider may, and in some embodiments does store information in the network headend indicating whether a particular customer and/or customer premise has an IP capable or non-IP capable STB. This information is used to remotely configure, from the network headend, the control panel in some embodiments so that the user is shielded from having to enter the type of STB into the control panel or control system.

In accordance with one aspect of various embodiments, a user is provided an opportunity to control one or more customer devices, e.g., a set top box, a television, a programmable oven, thermostat, light controller etc., to perform a function, while the user is enabling or disabling an alarm system, e.g., while leaving the customer premise or coming back to the customer premise. In various embodiments the devices are located at the customer premise. The function to be performed may include, e.g., turning the devices ON/OFF, recording content on a device, preserving content scheduled to be deleted, playing back recorded content etc.

While described in the context of combining alarm arm and disarm functions with other functions such as STB control, it should be appreciated that the control functions described herein can be used in a wide range of applications where a control panel is present whether or not an alarm is used or provided at the customer premise location.

In some embodiments a user is allowed to program controls and/or user selectable inputs to implement a plurality of user defined control options. Thus a user can customize the system as desired. One particularly desirable user customization is a "green button" which allows the user to turn off multiple devices and, optionally activate the home alarm, by pressing a single button when leaving the house. The control is referred to as a "green button" since it can be used to ensure that multiple or all devices are powered down when the home owner leaves thereby avoiding wasting energy which might occur if a user needs to individually turn off multiple devices with one or more devices potentially being overlooked and left on by the user when leaving home.

Numerous additional features, embodiments and benefits are described in the detailed description which follows.

DETAILED DESCRIPTION

Figure 1:
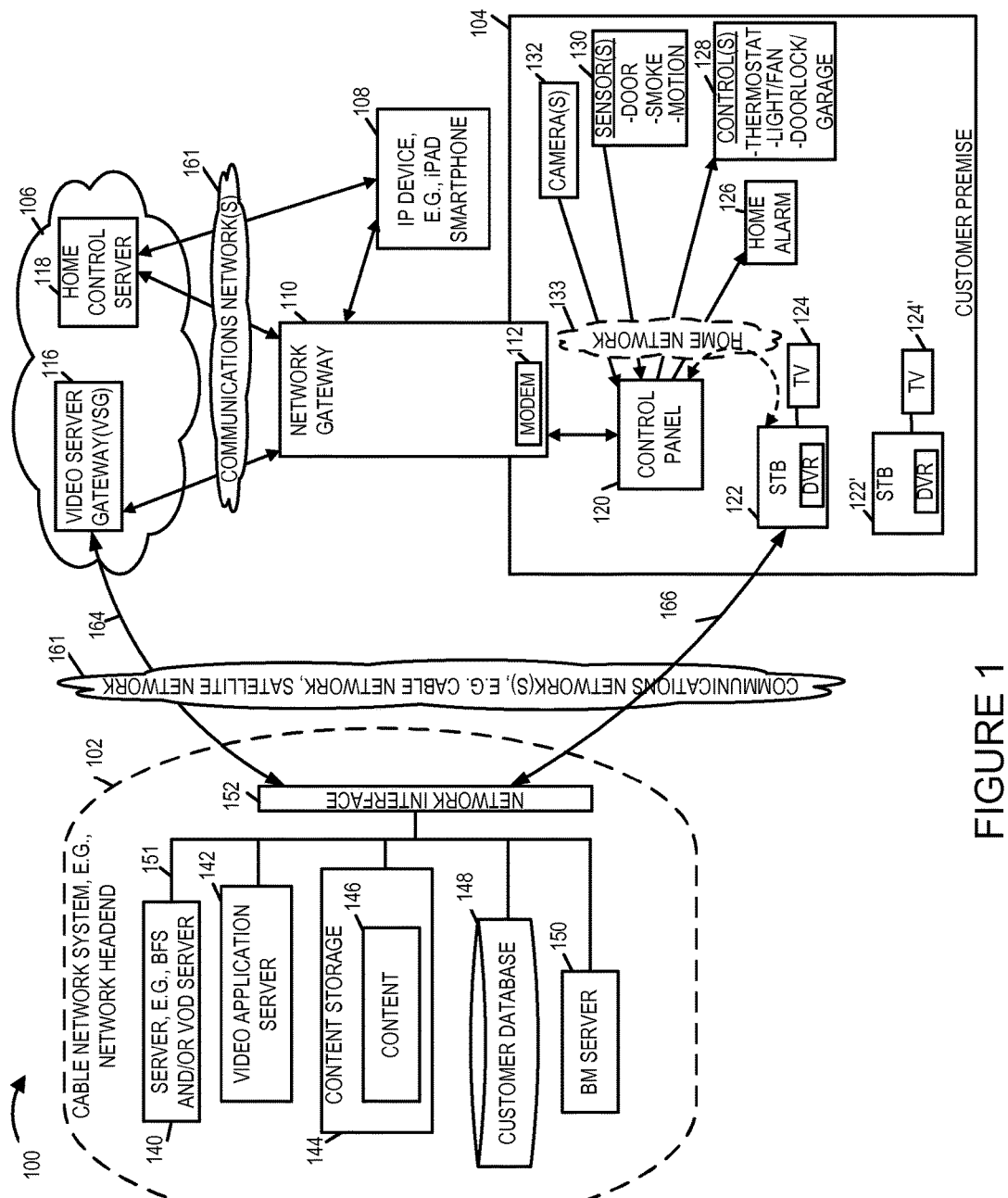
FIG. 1 illustrates an exemplary system implemented in accordance with the present invention.

FIG. 1 illustrates an exemplary system 100 implemented in accordance with one exemplary embodiment of the present invention. The system 100 supports delivery of content to customer devices, e.g., set top box, internet capable devices and internet TVs, mobile phones etc., and supports exchange of signaling between various system elements to facilitate controlling of various devices located at a customer premise via a single control interface in accordance with the invention. The system 100 includes a network headend 102, communication network(s) 161, e.g., cable network, internet, satellite network, a customer premise 104, an external controller system 106, an IP (internet protocol) device 108, e.g., personal computer, laptop, tablet device, Smartphone etc., and a network gateway 110.

It should be appreciated that system 100 may include a plurality of customer premises and a single customer premise 104 is shown for simplification. In various embodiments the IP devices such as IP device 108, support internet browsing and exchange of information over the internet.

The network headend 102 may be implemented at a cable network office or site and may include multiple servers and/or databases which are coupled together as shown. In the FIG. 1 example, the headend 102 includes a server, e.g., a broadcast file server (BFS) and/or a video on-demand (VOD) server 140, a video application server 144, content storage 144, a customer database 148, and a business management server 150. It should be appreciated that various servers and/or elements shown to be included in the headend 102 may reside outside the headend 102 in some embodiments and may be located anywhere in the system 100, e.g., in a distributed manner. In the FIG. 1 example, various servers and other elements included in the headend 102 are coupled together by a communications link 151. The local network 151 is coupled via one or more network interfaces 152 to other networks and/or devices. For example, the headend 102 is coupled via network interface 152 to communications network(s) 161, and may also be coupled to one or more other external networks.

Via the communications network(s) 161, the elements shown in the network headend 102 can send and/or exchange various information with the devices located at the customer premise 104, and with the IP device 108. Communications with customer premise devices in the case of non-IP capable STBs are, in some embodiments, in accordance with one or more DOCSIS standards while communications with IP capable devices may be, and in some embodiments are, via IP signals.

The customer premise 104 includes a control device, e.g., control panel 120, a set top box (STB) 122, a display device 124 which could be, e.g., standard television, a home alarm system 126, a controller 128 for controlling one or more devices such as a thermostat, lights/fans, door locks etc., one or more sensors collectively shown as sensor(s) 130 including door sensor, smoke sensor, carbon monoxide sensor, motion sensor, etc., and one or more cameras, e.g., security cameras for surveillance. Although not shown, customer premise 104 may also include additional STBs, display devices, internet capable TVs, computers, tablet devices, Smartphones etc. The STBs may be IP capable or non-IP capable devices or, when multiple STBs are present in a home, some may be IP capable while others are non-IP capable. Information is stored in customer records at the network headend identifying the types of STBs located at each of the plurality of customer premise locations served by a network headend and the network headend can, and in some embodiments does, supply such information to the control panel for purposes of configuring the control system located at a customer premise to interact with the STB(s) at the customer premise via the appropriate communications network, e.g., the home network in the case of IP capable STBs or the external communications network, e.g., cable network, in the case of non-IP capable devices such as DOCSIS STBs with DVR functionality.

The STB 122 may, and often does, include DVR functionality and the storage of user selected content, e.g., data and/or video, and audio content. The STB 122 can be integrated in a device which also includes a display. In some, but not all, embodiments the STB 122 is an IP capable set top box device, e.g., an STB which supports IP (internet protocol) and communications over the internet. In some embodiments the STB 122 is a legacy STB that does not support IP and communications over the internet. The STB support video, audio and optionally, E-mail functionality depending on the type of STB implemented in a given embodiment. The STB 122 can be used to send information to the network headend 102 in addition to receiving programming content and/or information from the headend 102.

The control panel 120 serves as control interface allowing the user to control a plurality of devices located at the customer premise 104 in accordance with the invention. The control panel may be implemented as a tablet computer or other device including a display, memory, processor and user input device. In the case of a touch screen device the display may act as both a display and input panel from which a user can select one or more user selectable options. Physical keys or buttons for alarming/disarming an alarm may be provided as an alternative to or in addition to a user selectable icon on a display which can be selected to activate and/or deactivate one or more device in addition to the home alarm. The control panel 120 controls and communicates with the various devices 126, 128, 130, 132 over the home network 133. In some embodiments where the STB 122 supports IP capability, the control panel 120 can communicate with the STB 122 over IP via the home network 133, e.g., as indicated by the dashed link between the STB 122 and control panel 120 traversing the home network 133. In some other embodiments where the STB does not support IP capability, the exchange of information between the control panel 120 and the STB 122 occurs over the communications network(s) 161 via the network gateway 110 and the video server gateway (VSG) 110. One or both of the network gateway 110 and video server gateway 110 may perform protocol conversion and/or signal conversion. For example, IP control and/or query signals may be converted by the VSG 110 to DOCSIS signals and DOCSIS signals from a STB may be converted by the VSG 110 to IP signals for communication to the control panel.

The network gateway 110 includes a modem 112 in some embodiments. In some embodiments the modem 112 is located at the customer premise 104 while in some other embodiments the modem is located external to the customer premise 104. The modem 112 in some embodiments is e.g., a cable modem.

As shown in FIG. 1, communications link 166 traversing the communications network(s) 161 couples the STB 122 to the various elements/servers shown in the network headend 102. In some embodiments the STB 122 includes a modem. Similarly, the video gateway server 116 in the controller system 106 is coupled to the various elements/servers shown in the network headend 102 via link 164 which traverses the network(s) 161. The IP devices 108 can also communicate with the various elements/servers shown in the network headend 102 over the network(s) 161.

The BFS and/or VOD server 140, among other things, is responsible for delivering programming content and/or other information including video on-demand content ordered by one or more customers to the customer devices, e.g., to STB 122 and/or other customer devices. In some embodiments BFS server and VOD servers are implemented as separate individual servers.

In accordance with one feature, a user at the customer premise 104 may control the STB 122 via the control panel 120 to perform various functions. In doing so, the control panel 120 needs to communicate with the STB 122, e.g., to control the STB to perform a function. The video application server 142, among other things, is responsible for facilitating exchange of information between the STB 122 and the control panel 120 in the embodiments where the STB 122 does not have IP capability. In some such embodiments the exchange of information between the STB 122 and the control panel 120 takes place over the communications network(s) 161 via the network gateway 110 and the VSG 116. The information communicated between the between the STB 122 and the control panel 120 includes, e.g., request for recording information, list of recorded programs, request to start playback of a recorded program on the STB, request to turn ON/OFF the STB etc.

The content storage 144 is the headend's local content store and serves to store programming content 146 which can be delivered to the customer devices. In some embodiments, the system 100 also includes a regional content storage device and/or a national content storage device which supplies content to content storage 144 of network head end 102.

Customer database 148 includes customer information, e.g., customer account information, customer subscription information, and other billing related information. Customer database 148 also includes customer/user profiles for individual subscribers associated with STBs. For example, the database includes a user profile associated with STB 122 that includes information about the user and/or services to which the user subscribes, user preferred control settings on the STB 122, the type of programs that the user watches, user favorites, recording logs etc. BM (Business management) server 150 processes billing information corresponding to customers serviced by the network headend 102.

Figure 2:
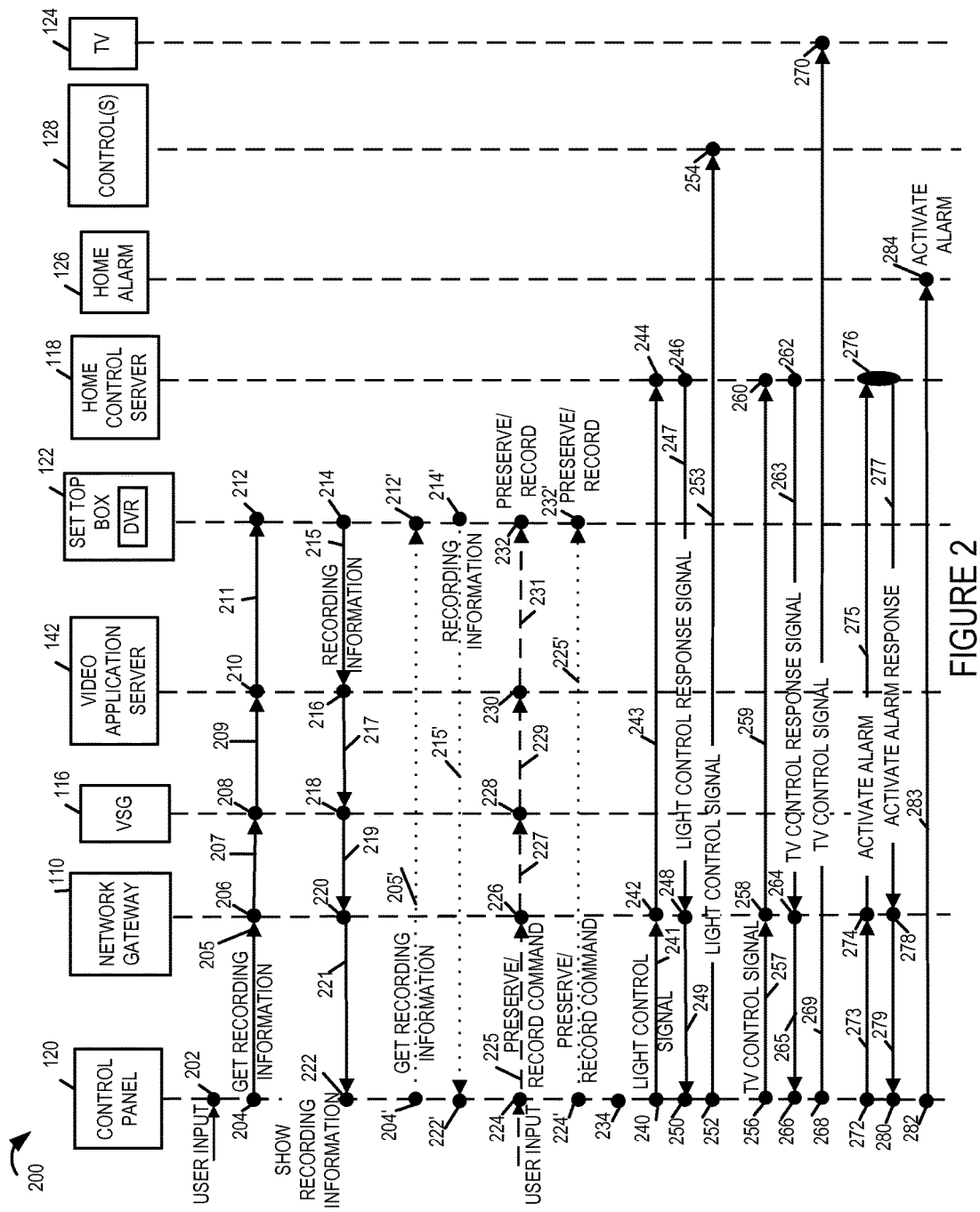
FIG. 2 illustrates the steps and associated signaling performed in one exemplary embodiment implemented using the system shown in FIG. 1, where a user is presented with an opportunity to control one or more devices while activating an alarm system.

Having generally discussed the exemplary system shown in FIG. 1, an exemplary method will now be discussed in detail with regard to the example shown in FIG. 2. Elements of the system 100 shown in FIG. 1 which participate in the method being discussed in the FIG. 2 example are shown at the top of FIG. 2 and bear the same reference numbers as used in FIG. 1. Messages, information, content and/or signals communicated between devices are represented in FIG. 2 using arrows.

At the top of FIG. 2, various elements 200 of the system 100 which may participate in facilitating controlling of one or more devices located at the customer premise 104 via the control panel, in accordance with one embodiment of the invention, are shown. The illustrated components 200 include, the control panel 120, network gateway 110, video server gateway (VSG) 116, video application server 142, set top box 122, home control server 118, home alarm system 126, device controls 128, and TV 124.

At times it may be desirable to be able to control a plurality of devices to perform a desired function without having to physically go at each and every single device and individually operate each device. For example, while leaving for work in the morning it is time consuming and tedious for a user to individually turn off all the lights, enable the home alarm, turn off various devices, set the home temperature (using a thermostat) higher/lower while the user is away, etc. Thus it may be desirable to be able to control, activate and/or deactivate multiple devices such as home alarm system, lights, TVs, computers, STBs, music systems etc., using a single control interface such as the control panel 120. In addition, it may be desirable to be able to view at a glance some information of interest to the user, such as for example, video recording information indicating what programs are scheduled to be deleted from the STB DVR, programs of interest which will be or are being broadcast that the user may want to record for later viewing etc. The user may view such information and may decide to preserve and/or record a program. FIG. 2, illustrates the steps and associated signaling used in one exemplary embodiment where a user at the customer premise 104 is provided an opportunity to control one or more devices such as the devices/controls 122, 124, 126, 128, 130, 132 to perform various functions, via the control panel 120, e.g., record a program, turn off a device, etc.

For the purposes of discussion consider a scenario where a user at customer premise 104 is leaving the premise 104, e.g., for work in the morning. A first user selectable control option to activate the home alarm system 126 is presented on the control panel 120. The process starts in step 202 where the user operates the control panel 120 to select the control option to activate the home alarm system 126 presented on the control panel 120 (e.g., by pressing an activation button on the control panel or by selecting the alarm activation option displayed on the display screen of the control panel 120 which supports touch screen functionality in some embodiments). Thus in step 202 the user input is received at the control panel 120, e.g., a selection of the alarm activation option by the user.

Following the receipt of the user input, in step 204 a signal 205 requesting video recording information corresponding to a recording device, e.g., such as the DVR on the STB 122, is sent from the control panel 120. Depending on the user selected control option in step 202, i.e., alarm activation option or alarm deactivation option, the requested video recording information may include, for example, a list of a list of programs scheduled to be deleted from which the user can select one or more programs for preservation, a list of suggested programs for recording, programs recorded while user way away, etc. Other information besides video recording information may be requested from other sources automatically in some embodiments in response to detecting the user input for alarm activation, such as e.g., traffic updates for a preferred route at the current time.

In some embodiments the destination for the request signal 205 for video recording information is the STB 122 which stores the video recording information in the memory. The video recording information corresponding to the recording device, e.g., STB 122, may also be stored in the headend 102. For the purpose of discussion of FIG. 2 example, consider that the STB 122 is a legacy STB device that does not support communications over IP. In such an embodiment the request signal 205 is communicated via various elements of the system 100 including the network gateway 110 and the VSG 116 as shown in FIG. 2 example. Accordingly, the control panel 120 sends the request signal 205 for video recording information to the network gateway 110. The network gateway 110 receives the signal 205 in step 206, processes the signal 205 and sends a signal 207 including the request for video recording information to the VSG 116. Signal 207 is received and processed by the VSG 116 in step 208. Further in step 208, the VSG 116 sends a signal 209 including the request for video recording information to the video application server 142 which receives the request signal 209 in step 210. In step 210 the video application server 142 finally sends a signal 211 including the request for video recording information to the STB 122. It should be appreciated that payload of the original request for video recording information signal 205 is preserved and included in each of the signals 207, 209 and 211 although the format of the messages/signals 205, 207, 209 and 211 communicated between various devices may be different.

In step 212 the STB 122 receives and processes the request for video recording information. FIG. 2 example is discussed assuming that the user is going out and selects the alarm activation option, thus in step 212 STB 122 looks up for the programs which are scheduled to be deleted, e.g., in a given time period, for example, in the next 24 or 48 or 72 hours, as per the terms and conditions set forth by the service provider. The STB 122 also generates a list of upcoming programs that the user may want to record. The selection of upcoming programs suggested for recording may, and in some embodiments is, based on the user's viewing habits in the past. In some embodiments information regarding the user's favorite programs, movies, channels, viewing habits etc., are collected and a user profile is generated which may be stored both in the STB 122 and at the headend 102. In some embodiments the user can himself/herself generate a user profile including such information as discussed above.

Figure 5:
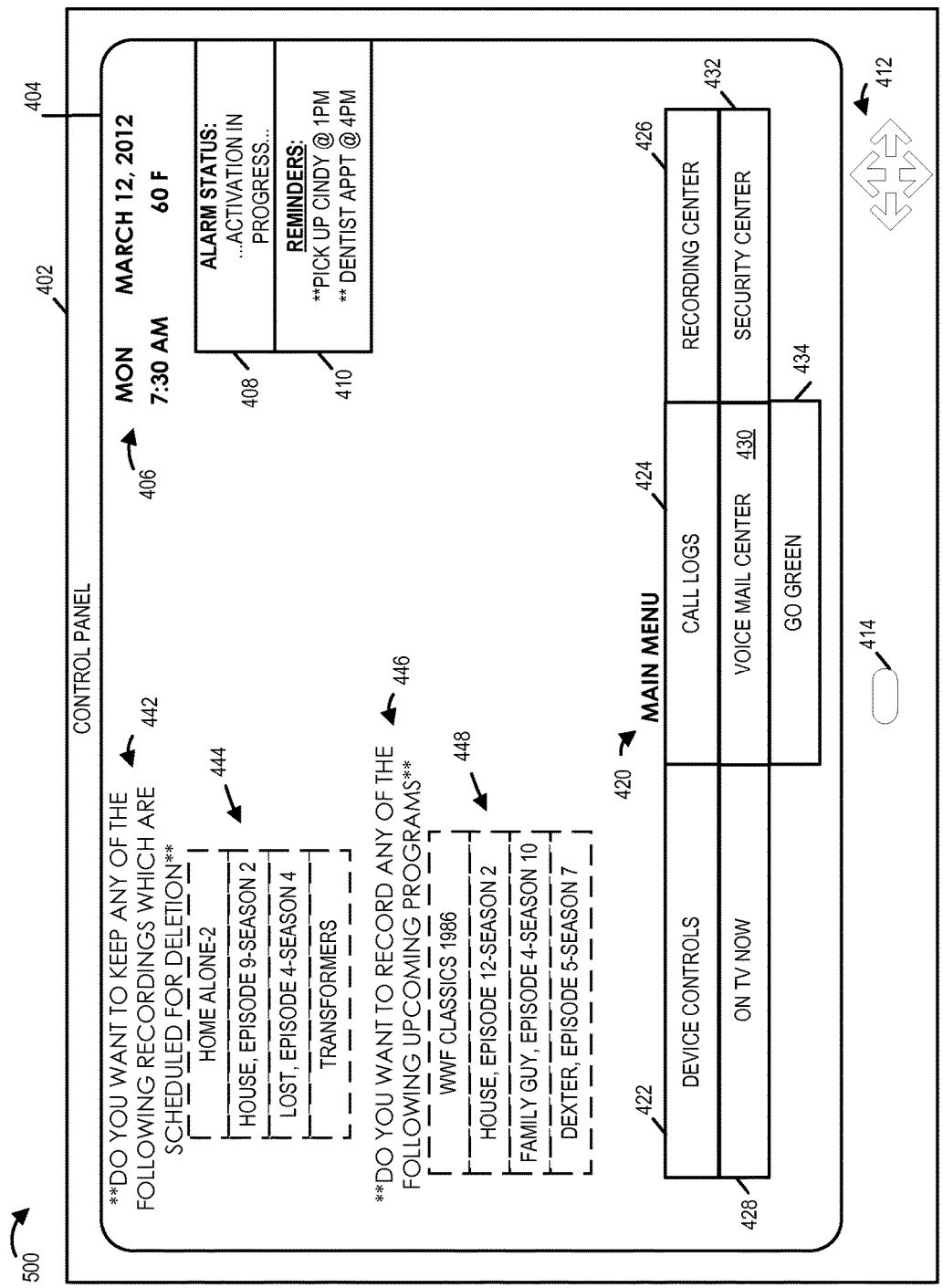

In step 214 the STB sends the recording information including, e.g., a list of programs scheduled for deletion from the STB 122 and a list of suggested upcoming programs that the user may want to record, in a signal 215 to the headend 102, e.g., over the communication network(s) 161. The signal 215 is received by the video application server 142 in step 216. The video application server 142 sends a signal 217 including the recording information which is received and processed by the VSG 116 in step 218. Further in step 218 the VSG 116 sends a signal 218 including the recording information to the network gateway 110 which receives the recording information in step 220 and sends a signal 221 including the recording information to the control panel 120. The control panel 120 receives the recording information in step 222. Further in step 222, the control panel 120 presents the recording information, e.g., at least one of: a list of the recorded programs scheduled for deletion, or a list of upcoming programs that the user may want to record, to the user on the display screen of the control panel 120 in a suitable display format. An exemplary control panel displaying recording information presented to the user on the display screen is illustrated in FIG. 5.

Steps 204', 212', 214' and 222' and the dotted arrows illustrate the steps and signaling performed in an alternative embodiment where a STB device with IP capability is used. Thus as should be appreciated, in such an embodiment the signaling exchange for the recording information is between the control panel 120 and the STB 122 over IP. The control panel 120 sends a request for recording information 205', e.g., over the home network which supports IP, and receives the recording information 215' from the STB 122 in response.

Following the presentation of recording information in step 222, the control panel 120 monitors to receive additional user input, e.g., input indicating user selection of an item from the presented recording information. In step 224 the control panel 120 detects selection of one or more items from the list presented to the user. For example, the user may select a recorded program scheduled to be deleted for preservation so that it is not deleted from the DVR and/or select an upcoming program for recording. Upon receiving the user input, in step 224 the control panel 120 sends a preserve and/or record control message 225 to the STB 122 indicating that the selected item should be preserved and/or that the selected program should be recorded. Again, as discussed earlier, in the legacy STB embodiment, the communications between the control panel 120 and the STB 122 occurs via a plurality of servers and gateways devices. Thus the preserve and/or record control message 225 is first sent to the network gateway 110 which receives and processes it in step 226. Further in step 226, the network gateway 110 then sends a signal 227 including the preserve and/or record control message to the VSG 116. In step 228 the VSG 116 sends a signal 229 including the preserve and/or record command to the video application server 142 which receives the signal in step 230. Finally in step 230 the video application server 142 sends a signal 231 to the STB, e.g., over the communications network(s) 161. The STB 122 receives the preserve and/or record control message and implements the preservation or recording operation as instructed. Thus as should be appreciated from the signaling, in embodiments where the STB 122 does not support IP capability, the preserve and/or record control message is transmitted to a server which is coupled to the STB 122 via a communications network that is external to the customer premise. The signaling shown using dashed arrows 225, 227, 229 and 231 is optional and is performed when user selection is detected in step 224. If no user input is detected in step 224, the signals shown using dashed arrows 225, 227, 229 and 231 are not generated and communicated.

Steps 224' and 232' and control message 225' shown in dotted arrows illustrate the steps and signaling in an alternative embodiment where the STB 122 support IP capability and thus the preserve and/or record control message 225' is sent from the control panel 120 to STB 122 simply over the home network 133 that supports IP. Thus it should be appreciated that the control message 225' is an IP based message transmitted over the home network 133 located at the customer premise when said video recording device is an IP capable device.

In step 234 the control panel waits for a time counter to expire before activating the alarm system 126 and turning off one or more devices. In some embodiments the control panel 120 starts the time counter initially when the user input in step 202 is received and waits for the counter to expire. The counter expires if no user input is detected at the control panel 120 for a predetermined amount of time, e.g., 60 seconds. The control panel 120 resets and restarts the time counter when a user input is detected. If the user input is not detected for the predetermined amount of time, the counter expires and the control panel 120 activates the alarm system 126. The predetermined amount of time gives the user enough time to leave the house before the alarm activation occurs. For example if the user selects the control option to activate the alarm in step 202 and does not provide an input in step 224 in response to viewing recording information presented in step 222, the control panel 120 just waits for the time to expire before activating the alarm. In another scenario, if the user selects some program for preservation or recording in step 224, the control panel 120 restarts the counter. Thus after receiving the last user input, for example in step 224, the control panel restarts the time counter and waits for expiration. The signaling illustrated in connection with steps 240 through 284 is performed following the expiration of time counter.

Consider that the user wants to turn off a plurality of devices, e.g., TVs, STBs, lights etc., before leaving the house. Such an option is presented to the user on the control panel 120 in the form of a button or icon on the display screen of the control panel 120. In some embodiments this option of turning off user selected multiple devices is called "GREEN BUTTON" or "GO GREEN" option which is available to select on the control panel 120. In some embodiments, the user can also configure the control panel 120 to implement the device turn off operation of various user selected devices upon the selection of alarm activation control option selected in step 202. The signaling associated with steps 240 through 284 in FIG. 2 example illustrates such a case where the user has configured the control panel 120 to turn off the lights and the TV when the alarm is activated. Thus in accordance with one feature of the invention, selecting a single exemplary control option from the control panel 120 allows the user to activate the alarm and control multiple devices to turn OFF/ON and/or perform a desired function.

Following the expiration of the time counter, in step 240 the control panel 120 sends a light control signal, e.g., control signal to turn one or more lights OFF. The light control signal is communicated to the home control server 118 via the network gateway 110 as shown in the figure. In step 244 the home control server 118 receives the light control signal, enters the information indicating the lights which are being turned OFF, in a device status log corresponding to the customer premise 104. The device status log is maintained by the home control server 118. In some embodiments the light control signal communicated to the home control server 118 includes information identifying at least one of the customer premise 104, controller 128 which controls the lights, or the control panel 120.

In step 246 the home control server 118 sends a response signal back to the control panel 120, via the network gateway 110, confirming the receipt of the light control signal and its approval to turn off the lights. In step 250 the control panel receives the light control response signal. In step 252 the control panel sends a light turn off command to the controller 128, e.g., over the home network 133, which receives the turn off command in step 254 and turns OFF the selected one or more lights.

Similarly, in step 256 the control panel 120 sends a TV control signal, e.g., control signal to turn a selected TV OFF. The TV control signal is communicated to the home control server 118 via the network gateway 110 as shown in the figure. In step 260 the home control server 118 receives the TV control signal, enters the information indicating that the TV is being turned OFF, in the device status log corresponding to the customer premise 104. In step 262 the home control server 118 sends a response signal back to the control panel 120, via the network gateway 110, confirming the receipt of the TV control signal and its approval to turn off the TV. In step 266 the control panel 120 receives the TV control response signal. In step 268 the control panel sends a TV turn off command to the TV 124, e.g., over the home network 133. The TV 124 receives the turn off command in step 270 and turns OFF. In some embodiments the TV control signal communicated to the home control server 118 includes information identifying at least one of the customer premise 104, TV 124, or the control panel 120.

In step 272 the control panel 120 sends an alarm activation control signal, e.g., control signal indicating the alarm system is being activated. The alarm activation control signal is communicated to the home control server 118 via the network gateway 110 as shown in steps 274 and 276. In some embodiments the alarm activation control signal communicated to the home control server 118 includes information identifying at least one of the customer premise 104, alarm system 124, or the control panel 120. In step 276 the home control server 118 receives the alarm activation control signal, enters the information indicating that the alarm system is being activated, in the device status log corresponding to the customer premise 104. Further in step 276 the home control server 118 sends a response signal back to the control panel 120, via the network gateway 110, confirming the receipt of the alarm activation control signal and its approval to activate the alarm. In step 280 the control panel 120 receives the alarm activation control response signal. In step 282 the control panel 120 sends an alarm activation control command to the home alarm system 126, e.g., over the home network 133. The home alarm system receives the activation command in step 284 and activates the alarm.

Although FIG. 2 example illustrates the alarm activation control signal, light control signal, and TV control signal being sent separately to the control server 118, it should be appreciated that in some embodiments these control signals are sent together as part of a single message to the home control server 118 which then responds in a single response signal. The control panel 120 then sends signals to the controller 128, TV 124 and the alarm system 126 asynchronously over the home network so that these devices implement the instructed function in parallel, e.g., the lights will turn OFF, the TV will turn OFF and the alarm system will activate approximately around the same time.

Figure 3:
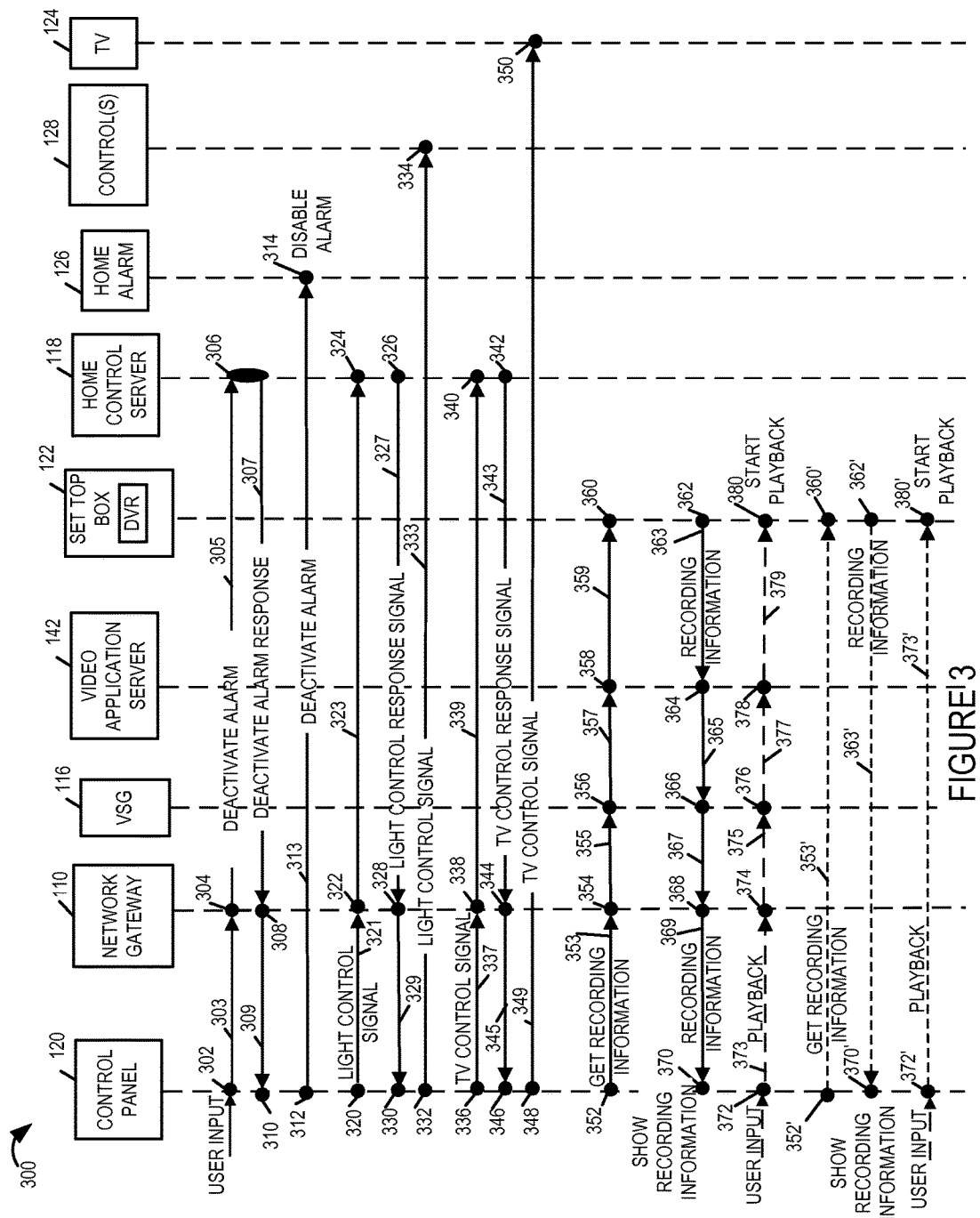
FIG. 3 illustrates the steps and associated signaling performed in one exemplary embodiment implemented using the system shown in FIG. 1, where a user is presented with an opportunity to control one or more devices while deactivating an alarm system.

FIG. 3 is a drawing 300 illustrating the steps and associated signaling used in one exemplary embodiment where the user at the customer premise 104 is provided an opportunity to control one or more devices such as the devices/controls 122, 124, 126, 128, 130, 132 to perform various functions, via the control panel 120. The steps and signaling illustrated in FIG. 3 presents an example where the user selects an alarm deactivation control option on the control panel, e.g., after returning back home at the customer premise 104. Messages, information, content and/or signals communicated between devices are represented in FIG. 3 using arrows. Various elements of the system 100 shown in FIG. 3 are the same as the ones shown in FIG. 2 example.

For the purposes of discussion consider a scenario where the user returns at customer premise 104, e.g., returns back from work in the evening. A first user selectable control option to deactivate the home alarm system 126 is presented on the control panel 120. The process starts in step 302 where the user operates the control panel 120 to select the control option to deactivate the home alarm system 126 presented on the control panel 120 (e.g., by pressing a deactivation button on the control panel or by selecting the alarm deactivation option displayed on the display screen of the control panel 120). Further consider that the user has configured the control panel 120 to turn ON various user selected devices, e.g., lights, TV, etc., upon the selection of alarm deactivation control option selected in step 302. Thus in step 302 the user input is received at the control panel 120, e.g., a selection of the alarm deactivation option by the user.

Following the receipt of the user input, in step 302 the control panel 120 sends an alarm deactivation control signal, e.g., control signal indicating the alarm system is being deactivated. The alarm deactivation control signal is communicated to the home control server 118 via the network gateway 110 as shown in step 304. In step 306 the home control server 118 receives the alarm deactivation control signal and enters the information indicating that the alarm system is being deactivated in the device status log corresponding to the customer premise 104. Further in step 306 the home control server 118 sends a deactivation control response signal back to the control panel 120, via the network gateway 110, confirming the receipt of the alarm deactivation control signal and its approval to deactivate the alarm 126. In step 308 the response signal 307 is received by the network gateway 110 and then a signal 309 including the response signal information is communicated by the gateway 110 to the control panel 120. In step 310 the control panel 120 receives the alarm deactivation control response. In step 312 the control panel 120 sends an alarm deactivation control command to the home alarm system 126, e.g., over the home network 133. The home alarm system 126 receives the deactivation command in step 314 and deactivates the alarm system.

As discussed above, in accordance with one feature of some embodiments the user can control multiple devices to start performing a desired function, e.g., turn ON, upon selecting the alarm deactivation. Consider that in the example of FIG. 3 the user settings on the control panel 120 allow the control panel to turn a number of user selected devices ON upon selection of alarm deactivation control option on the control panel 120.

Following the selection of alarm deactivation control option, in step 320 the control panel sends a light control signal, e.g., control signal to turn ON one or more lights. The light control signal is communicated to the home control server 118 via the network gateway 110 as shown in FIG. 3. In step 324 the home control server 118 receives the light control signal, enters the information indicating the lights which are being turned ON, in the device status log corresponding to the customer premise 104. In step 326 the home control server 118 sends a response signal back to the control panel 120, via the network gateway 110, confirming the receipt of the light control signal and its approval to turn ON the lights. In step 330 the control panel 120 receives the light control response signal. In step 332 the control panel 120 sends a light turn ON command to the controller 128, e.g., over the home network 133, which receives the turn ON command in step 334 and turn ON the selected one or more lights.

Similarly, in step 336 the control panel 120 sends a TV control signal, e.g., control signal to turn a selected TV ON. The TV control signal is communicated to the home control server 118 via the network gateway 110 as indicated in steps 338 and 340. In step 340 the home control server 118 receives the TV control signal, enters the information indicating that the TV is being turned ON in the device status log corresponding to the customer premise 104. In step 342 the home control server 118 sends a response signal back to the control panel 120, via the network gateway 110, confirming the receipt of the TV control signal and its approval to turn the TV ON. In step 346 the control panel 120 receives the TV control response signal. In step 348 the control panel 120 sends a TV turn ON command to the TV 124, e.g., over the home network 133. The TV 124 receives the turn ON command in step 350 and turns ON. In some embodiments the user can configure the TV 124 to display a specific channel, e.g., a news channel, upon receipt of the turn ON command from the control panel 120.

Although in the FIG. 3 example, the alarm deactivation control signal, light control signal, and TV control signal are illustrated as being sent separately to the control server 118, it should be appreciated that in some embodiments these control signals are sent together as part of a single message to the home control server 118. In some such embodiments the control panel 120 sends a control signal to each of these devices asynchronously over the home network so that these devices implement the instructed function in parallel, e.g., alarm system deactivates, the lights turn ON and the TV turns ON approximately around the same time.

Further in accordance with one feature of the invention, following the selection of alarm deactivation control option and deactivation of the alarm system 126, in step 352 the control panel 120 sends a signal 353 requesting video recording information corresponding to a video recording device, e.g., such as the DVR on the STB 122. In case of the selection of alarm deactivation control option, the requested video recording information includes e.g., a list of programming content recorded while user way away, etc. In the embodiment of a legacy STB that does not support communications over IP, the request signal 353 for video recording information is sent from the control panel 120 to the STB 122 via various gateways as should be appreciated from the steps 352 through 360. The control panel 120 sends the request signal 353 for video recording information to the network gateway 110. The network gateway 110 receives and processes the signal 353 in step 354 and sends a signal 355 including the request for video recording information to the VSG 116. Signal 355 is received and processed by the VSG 116 in step 356. Further in step 356, the VSG 116 sends a signal 357 including the request for video recording information to the video application server 142 which receives the request signal 357 in step 358. In step 358 the video application server 142 finally sends a signal 359 including the request for video recording information to the STB 122. It should be appreciated that payload of the original request for video recording information signal 353 is preserved and included in each of the signals 355, 357 and 359 although the format of the messages/signals 353, 355, 357 and 359 communicated between various devices may be different.

In step 360 the STB 122 receives and processes the request for video recording information. In step 360 STB 122 determines that the requested video recording information concerns the programs recorded while the user was away, e.g., after the user activated the alarm and left the customer premise 104. The STB 122 generates a list of the recorded programs, e.g., which the user may have selected for recording before leaving the customer premise 104.

Figure 8:
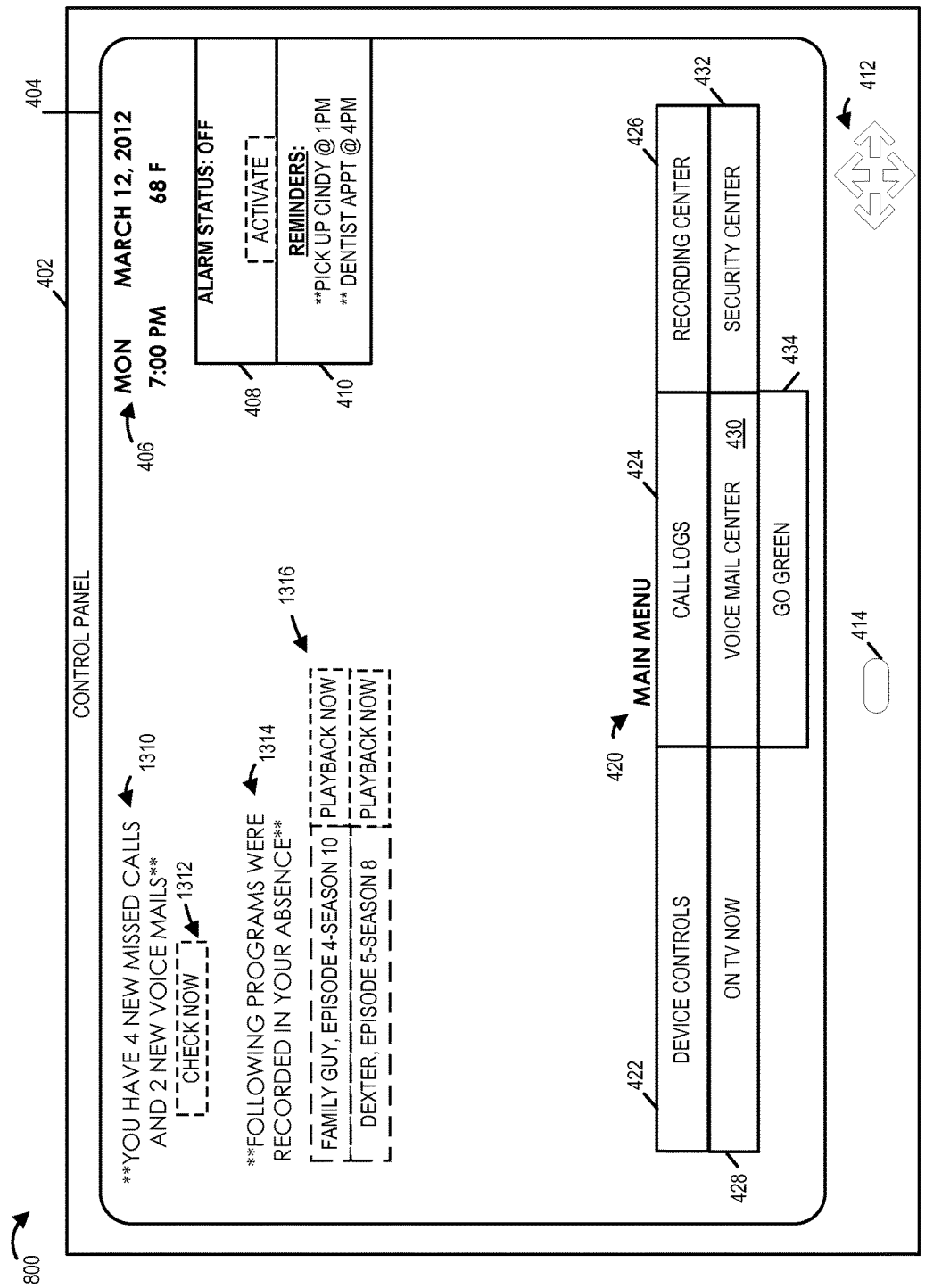

In step 362 the STB 122 sends the recording information including, e.g., a list of recorded programs to the video application server 142, e.g., over the communication network(s) 161. The recording information is received by the video application server 142 in step 364. Further in step 364 the video application server 142 sends a message 365 including the recording information to the VSG 116 which receives and processes the message 365 in step 366. Further in step 366 the VSG 116 sends a signal 367 including the recording information to the network gateway 110 which receives the recording information in step 368 and sends a signal 369 including the recording information to the control panel 120. The control panel 120 receives the recording information in step 370. Further in step 370, the control panel 120 presents the recording information, e.g., a list recorded programs, to the user on the display screen of the control panel 120 in a suitable display format. In some embodiments, the displayed information shows the recorded items and provides an option to the user to select am item for playback, e.g., by selecting a button or icon on a touch screen display of the control panel 120. An exemplary control panel display screen showing the display of recording information presented to the user on the display screen is illustrated in FIG. 8.

Following the presentation of recording information to the user in step 370, the control panel 120 monitors to receive additional user input, e.g., input indicating user selection of an item from the presented recording information, e.g., for playback. In step 372 the control panel 120 detects selection of an item from the list of recorded items presented to the user. For example, the user may select a recorded program for playback. Upon receiving the user input indicating the selection, in step 372 the control panel 120 sends a playback control message 373 to the STB 122 indicating that the selected item is selected for playback. The playback control message 373 is received and processed by the network gateway 110 in step 374. Further in step 374, the network gateway 110 sends a signal 375 including the playback control message payload to the VSG 116. In step 376 the VSG 116 sends a signal 377 including the playback control message payload to the video application server 142 which receives the signal in step 378. Further in step 378 the video application server 142 sends a signal 379 including the playback control message payload to the STB 122, e.g., over the communications network(s) 161. In step 380 the STB 122 receives the signal communicating the playback control message and starts playback of the selected recorded program content as instructed, e.g., starts playing the recorded program on TV 124. The signaling shown using dashed arrows 373, 375, 377 and 379 is optional and is performed depending on whether a user selection is detected in step 372. If no user input is detected in step 372, the signals shown using dashed arrows 373, 375, 377 and 379 are not generated and communicated.

Steps 352', 360', 362', 370', 372' and 380' and the dotted arrows illustrate the steps and signaling performed in an alternative embodiment where a STB 122 is a device that supports IP communications. Thus as should be appreciated, in such an embodiment the signaling exchange for the recording information is between the control panel 120 and the STB 122 over IP. The control panel 120 sends a request for recording information 353', e.g., over the home network which supports IP, and receives the recording information 363' from the STB 122 in response. It should be appreciated that in such embodiments the control message 353' and the response 363' are IP based messages transmitted over the home network 133 located at the customer premise when the video recording device, e.g., STB 122, is an IP capable device. In step 372' the user detects user input indicating selection of a recorded item for playback and sends a playback control message 373' to the STB 122 for playback. In step 380' the STB 122 starts playback of the recorded program.

Figure 4:
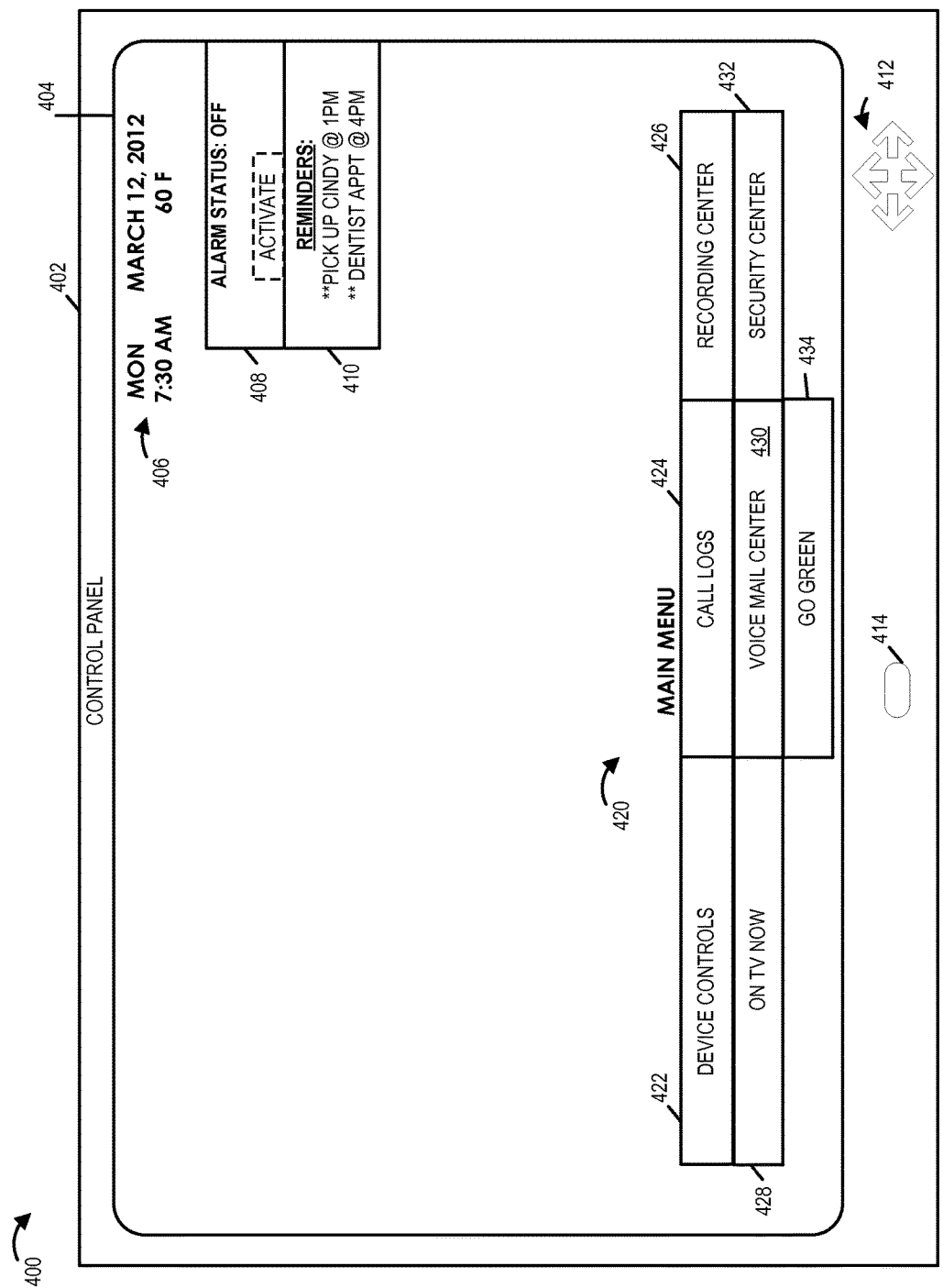
FIGS. 4-13 illustrate exemplary control panel display screens, in accordance with the invention.

FIG. 4 is a drawing 400 illustrating an exemplary control panel display, in accordance with the invention. FIG. 4 shows a control panel 402 including a display screen 404 region, up/down/left/right scroll keys 412, and a ON/OFF/RESET button 414. The control panel 402 can be used as the exemplary control panel 120 illustrated in FIGS. 1-3 and performs the functions discussed with regard to the control panel 120 discussed above. In various embodiments the display screen 404 supports touch screen functionality.

As shown in the figure, the top right hand corner of the display screen shows a display region 406 that displays day, date, time and temperature. The section identified using reference number 408 displays the status of alarm, e.g., whether alarm is currently ON or OFF, and includes an icon "ACTIVATE" which a user can select, e.g., by pressing the icon on the touch screen display 404 in the touch screen embodiment. In non-touch screen embodiments the user can scroll to various sections on the screen and select control options using the scroll keys. In such non-touch screen embodiments some additional control buttons, e.g., "select" and "cancel", etc. are provided.

It should be appreciated that FIG. 4 illustrates a control panel display at a time of inactivity, that is, when the alarm is not active as indicated by the alarm status in section 408. Section 410 represents an optional section which is used to display reminders set by the user. For example the user can set reminders for a certain day, e.g., next day, so that the user can see them before leaving the house while activating the alarm system using the control panel.

The region 420 illustrated on the bottom half of the display screen 404 shows the MAIN MENU section of the control panel 402 as displayed on the screen. The main menu includes a device controls icon 422, a call logs icon 424, a recording center icon 426, a "on TV now" icon 428, a voicemail center icon 430, a security center icon 432 and a "Go Green" icon 434. The user can select any of the icons displayed on the screen to view the detailed menu for the selected item.

The device controls 422 provides information for various devices which can be controlled using the control panel 402 and provides user selectable control options which allow the user to control these devices. For example when the device control icon 422 is selected, a graphical interface/menu is presented on the control panel display 404 with various control options to control various different devices. The devices may include, e.g., TV 122, set top box 122, a thermostat, fans, oven etc.

The call logs icon 422, when selected by the user, provides a call log showing recent call history including e.g., missed called, received calls, dialed calls. User selectable control options are provided to view the call details. In some embodiments the call logs are retrieved by the control panel 402 for display to the user.

The recording center icon 424, when selected by the user, provides a graphical interface/menu on the control panel display 404 with various recording options, e.g., to see a log of recorded items recorded on the recording device, e.g., STB 122, schedule recording for an item, a list of scheduled recordings etc.

On TV NOW icon 428, when selected, provides a list of suggested programs which are currently on TV or will be on TV, that the user may be interested in watching. The Voicemail center icon 430, when selected by the user, provides a log of recent voicemails and also provides a user selectable option to playback the voicemail from a telephone answering machine.

Security Center icon 432, when selected by the user, provides information on the status of for various security devices, e.g., cameras, motion sensors, alarms, door locks etc. A user selectable option to control and/or view a feedback from the security devices is also provided and displayed on the control panel 402 in some embodiments. For example a user selectable option to view the video feed from the security camera is provided. The user can select to view the video feed on a security monitor or the TV 124 or even on the control panel screen in some embodiments.

Go Green icon 434, when selected by the user, controls a plurality of user selected devices (which may have been previously selected by the user) to turn off at once. For example the user may configure the control panel to include a number devices, e.g., one or more of a TV, computer, lights, fans, music system, STB etc. in an exemplary GREEN list. In some embodiments when the user selects the Go GREEN icon 434, for example, before leaving the customer premise or while going to sleep, the devices in the GREEN list turn OFF.

FIG. 5 is a drawing 500 that shows exemplary control panel 402 with an exemplary screen 404 that may, and normally is, displayed in some embodiments after a user has selected alarm activation. The display portion of the screen 402 includes a plurality of fields designed to provide the user with information about the alarm status, DVR control options and recording suggestions. Field 442 shows a prompt inquiring if the user would like to keep any of the recordings listed in Field 444 which are scheduled to be deleted, e.g., as part of normal DVR maintenance as may be expected when unwatched scheduled recordings are automatically deleted at the end of a particular time window from when the recordings were made, e.g., two weeks, or because of storage space limitations. The list of recordings shown in field 444 are obtained from the STB located at the user's customer premise at which the control panel 402 is located and are presented to the user to allow the user to select one or more recordings to be saved. In this manner, the user is provided a useful reminder of the recordings to be deleted before leaving home and given a chance to select recordings to be preserved, e.g., for later viewing. Field 446 prompts the user to indicate if he/she would like to record one or more programs which are presented in the list of items indicated in field 448 as recording suggestions. A user can select from the programs listed in 444 and 448 by simply tapping on the corresponding portion of the display 404 in the case of a touch sensitive display embodiment.

Note that in field 406 the current date, time and temperature inside and/or outside the house are displayed. A user may select the information to be displayed in field 406 as part of configuration of the control panel and/or alarm system. In the FIG. 5 example the screen 404 corresponds to a point in time following user selection of alarm activation but prior to the alarm being made active, e.g., with a 60 or 90 second window provided for the user to exit the home. Accordingly status field 408 shows that with regard to the alarm, the status is alarm "activation in progress". Field 410 shows reminders set by the user, e.g., to pick up a child, CINDY, and of an upcoming dentist appointment. Such reminders may be entered via a PC, mobile phone and/or other IP capable device capable of interacting with the control system. Note that alarm activation will occur in some embodiments 60 or 90 seconds, or some other user configured time, from the last input entered by the user following selection of the alarm activation button or input option. This provides the user time after making one or more control/recording selections to leave the house. Thus, each time the user presses or makes a selection on the control panel the exit timer is reset thereby allowing the user time to make one or more recording/STB control selections without having to worry about completing the STB control selections prior to the exit timer expiring.

Figure 6:
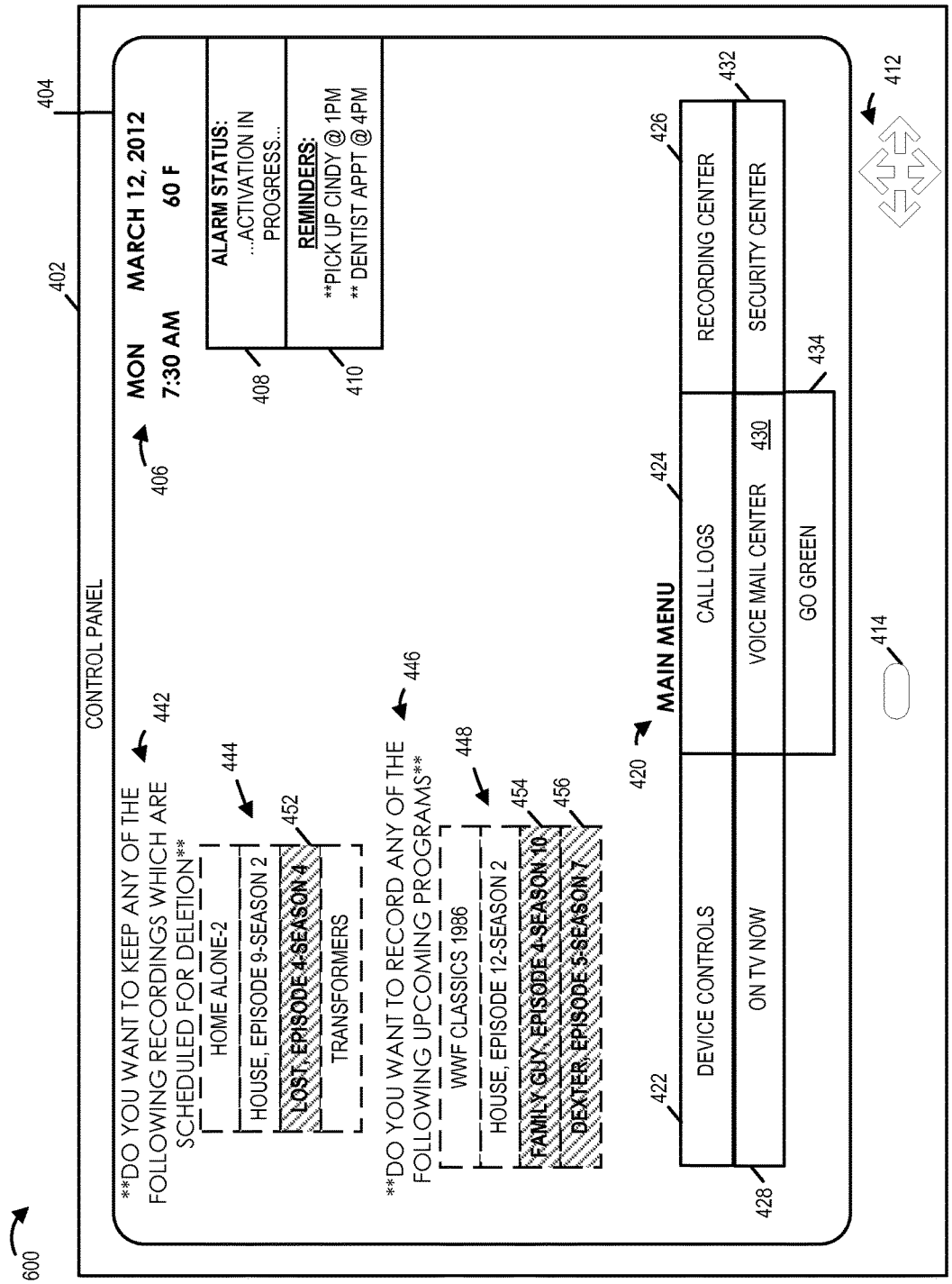

FIG. 6 is a drawing 600 showing the screen 404 of control panel 402 at a point in time when the user has selected one or more items to be recorded and/or preserved from the list 444 and 448. The user recording preservation and recording selections are highlighted to illustrate the user selections. As shown in FIG. 6, the user has selected LOST EPISODE 4, SEASON 4 to be preserved by selecting field 452 which, as a result of the user selection is shown as being highlighted indicating user selection. As can be seen from the highlight of fields 454 and 456 the user has also selected FAMILY GUY, EPISODE 4 SEASON 10 and DEXTER EPISODE 5 SEASON 7 for recording from the list of upcoming events presented as recording suggestions. As a result of these selections, the control panel 402 will signal the STB 122 in the customer premise 104 where the control panel 402 is located, e.g., via the external network in the case of a DOCSIS compatible STB and via the home network in the case of a IP capable STB, to preserve the selected recordings for later viewing and to record the programs selected for recording.

Figure 7:
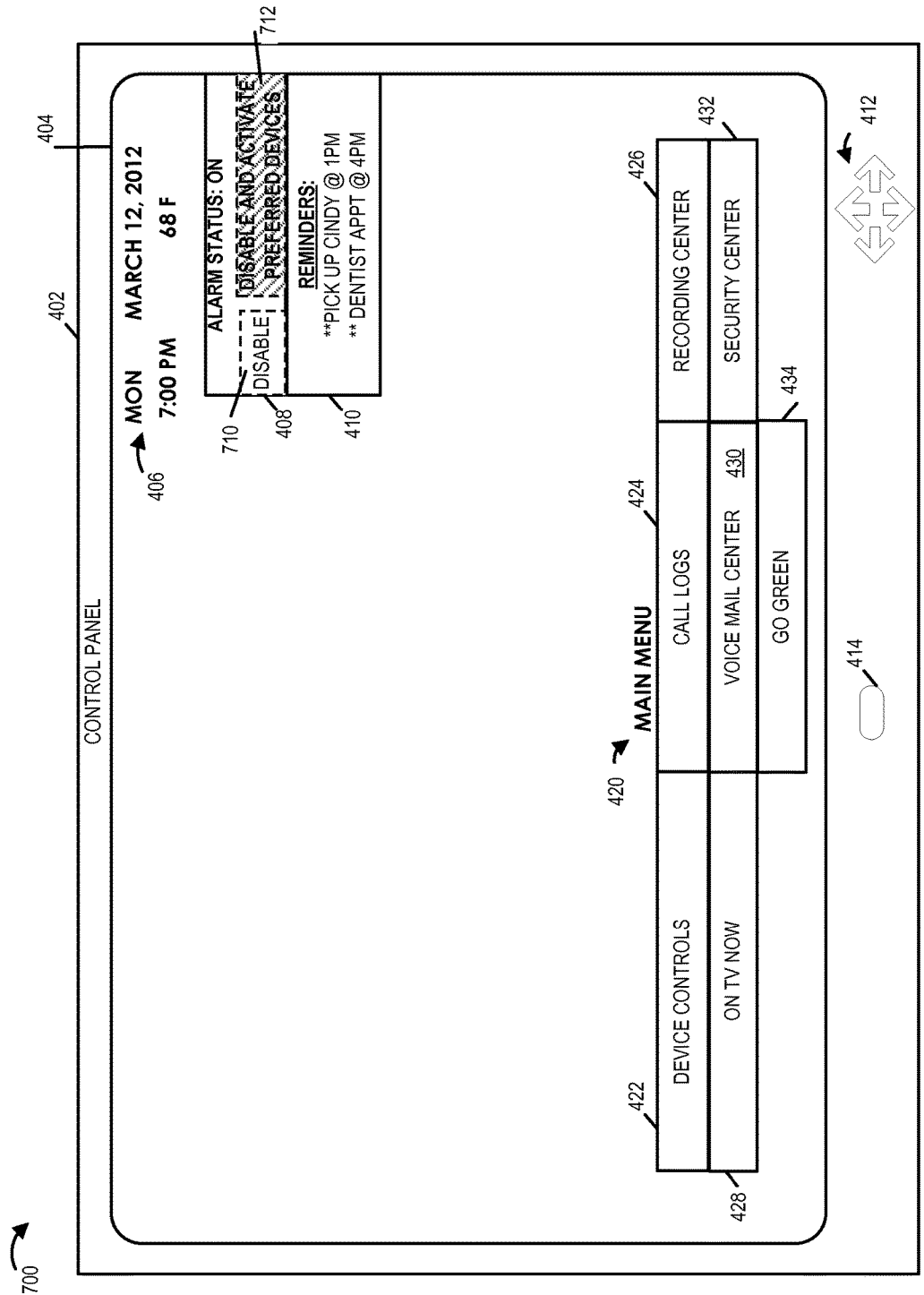

FIG. 7 is an illustration 700 showing the exemplary control panel 402 that is displayed when the corresponding home alarm is on, e.g., active, as may be encountered by a user returning home. The user is presented with multiple control options, e.g., a simple alarm disable option 710 shown in Field 408 or a multi-function disarm option 712 also shown in field 408. Selection of option 710 simply disables the alarm system 126 while selection of option 712 triggers deactivation of the alarm system 126 but also a variety of other functions such as turning on home lights and a TV and the presentation of a variety of recordings made since the alarm was activated from which the user can select a recording for immediate playback on the TV located at the customer premise. Option 712 is shown highlighted in FIG. 7 indicating that the user has selected this option in the FIG. 7 example.

In response to selection of option 712, the control panel 402 sends the signals necessary to deactivate the alarm, turn on the TV, home lights and retrieve recording information from the STB located at the customer premise where the control panel 402 is located.

FIG. 8 is a drawing 800 of the exemplary control panel 402 including the screen 404 showing various fields which are displayed following selection of the multi-function alarm deactivation option 712. Note that field 408 shows that the alarm is now off and provides the user a chance to activate the alarm should the user so desires. In addition, reminders are shown in field 410. Notably, following alarm deactivation and retrieval of recording information the user is provided a list of recordings that were made since the alarm was activated, e.g., while the user was away. Field 814 displays a message indicating to the user that the listed programs were recorded in the user's absence while field 816 lists the recordings that were made along with a user selectable playback option. In addition to retrieving recording information, the control panel 402 may retrieve message information, e.g., voice messages and/or missed call information, e.g., from a voice or phone server, and display such information. Field 810 indicates that the user has 4 new missed calls and 2 new voice mails in the FIG. 8 example while user selectable field 812 presents the user the chance to check, e.g., retrieve the messages and missed call log.

Figure 9:
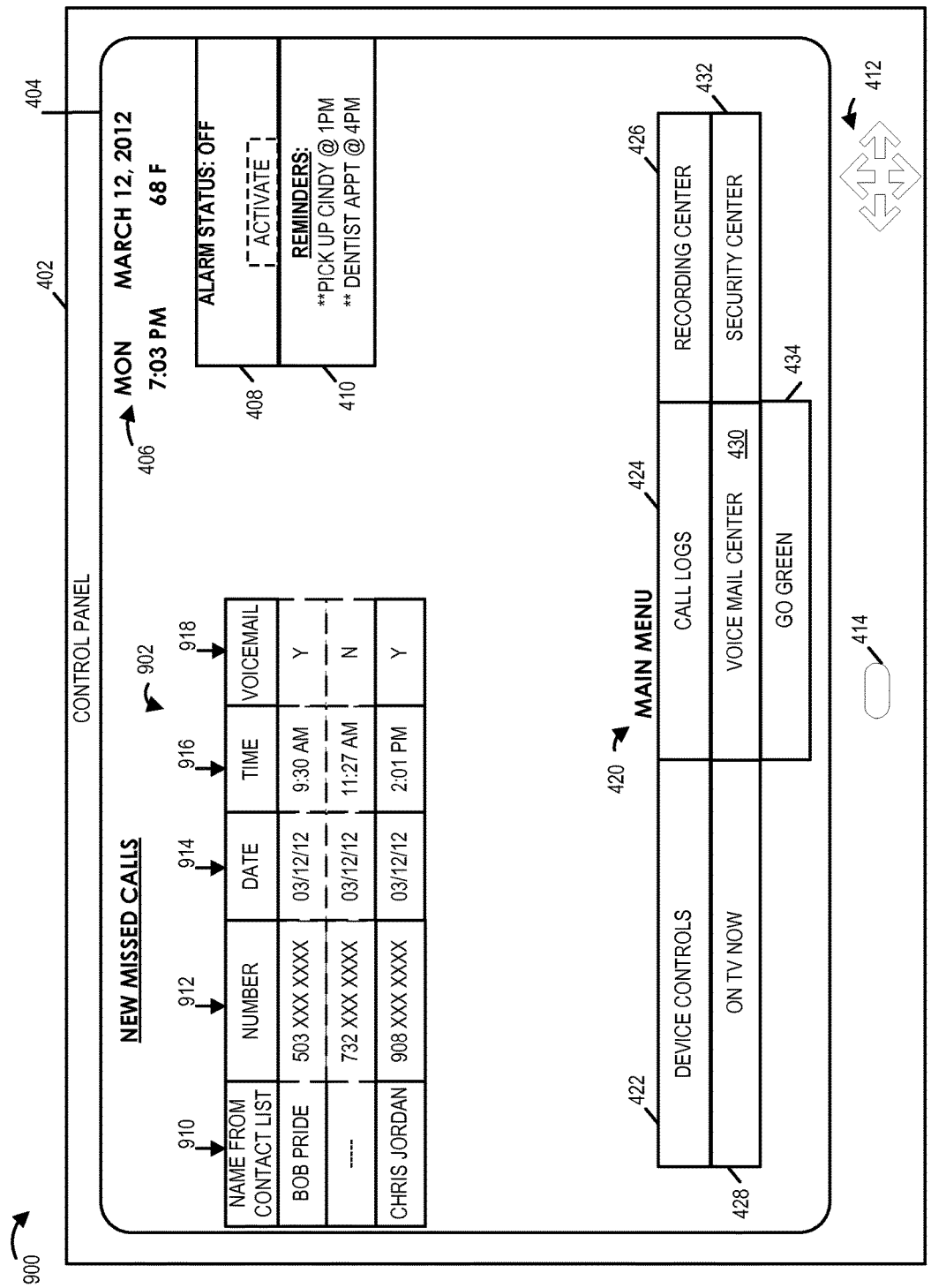

Assuming for purposes of explanation that the user selected option of field 812 to view missed calls and message information, a screen such as that shown in FIG. 9 may be displayed.

FIG. 9 is an illustration 900 of the control panel 402 with the screen 404 showing missed call information as shown in field 902. Field 902 includes multiple rows each corresponding to a different missed call. Each row includes a caller name field 910 which includes caller ID information identifying, when available, the caller who made the missed call, a telephone number field that shows the number from which the call was made indicated by the entry in column 912, a date field of the call indicated by the entry in column 914, the time field indicating the time of the call as indicated by the entry in column 918, and a voice mail field indicating whether the caller left a voice mail message as indicated by the entry in column 918. If a voice mail message was received, a user may tap on the voice mail entry in column 918 to retrieve and playback the corresponding voice mail message via the control panel 402.

Figure 10:
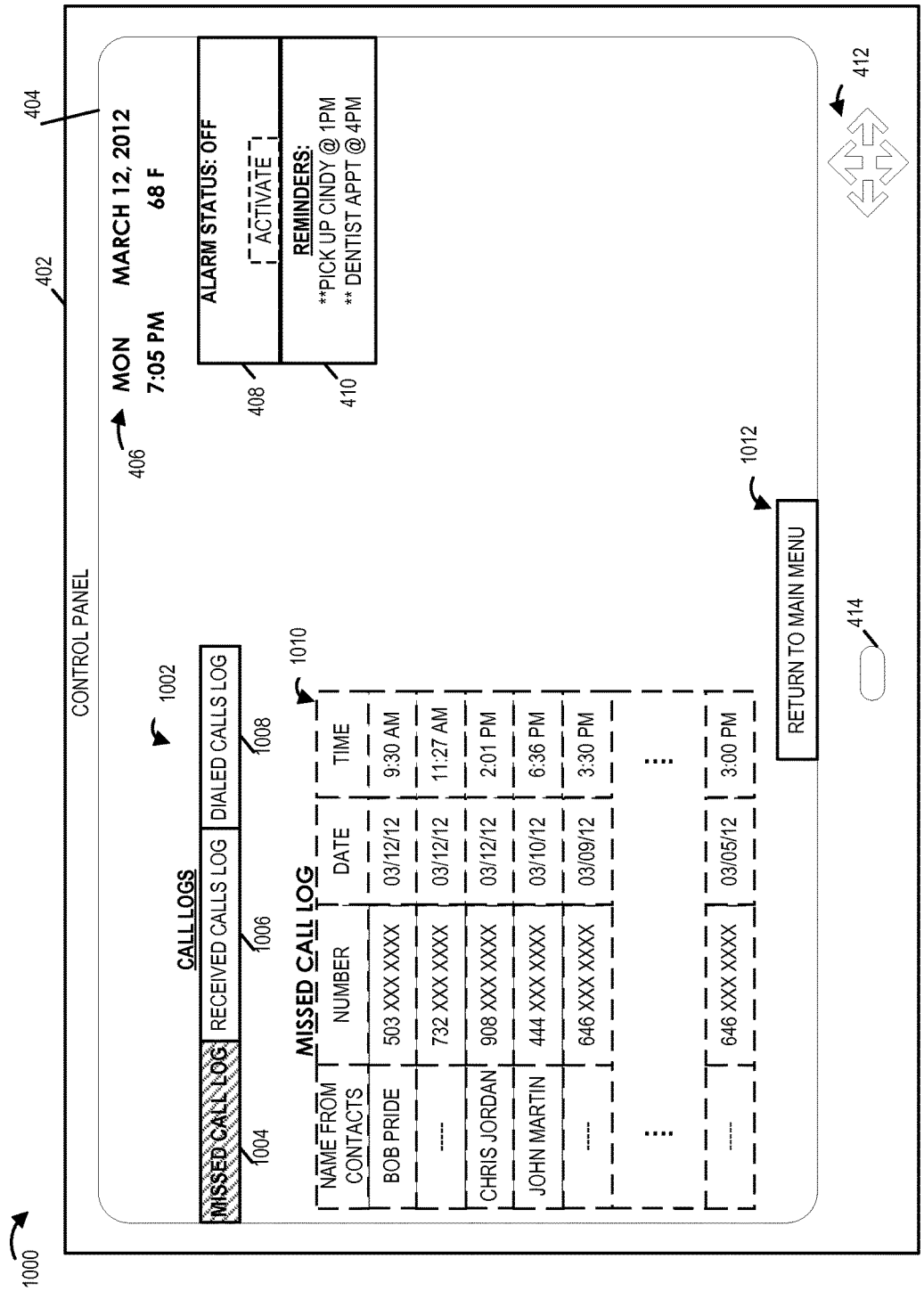

FIG. 10 is a drawing 1000 showing the display screen 404 of control panel 402 showing various fields which are displayed following selection of the CALL LOGS field 424 from the main menu 420 on the control panel 402 discussed in FIG. 4. Section 1002 shows the options normally presented on the display screen 404 to the user following the selection of the CALL LOGS field 424 from the main menu 420. The displayed CALL LOGS 1002 includes a missed calls field 1004, a received calls field 1006 and a dialed calls field 1008. The user can tap on any one of the fields to view the details and take further action. For discussion purposes consider that the user has selected to view missed calls field 1004 which is highlighted to illustrate the user selection.

Following the selection of Missed Calls field 1004, a missed call log 1010 is presented to the user. The information displayed in the missed call log 1010 is similar to the information presented in section 902 discussed above in FIG. 9 example. The bottom portion of the display screen shows a "return to main menu" field 1012 which can be selected by the user to go exit out from the currently displayed screen and/or go back to the main menu.

Figure 11:
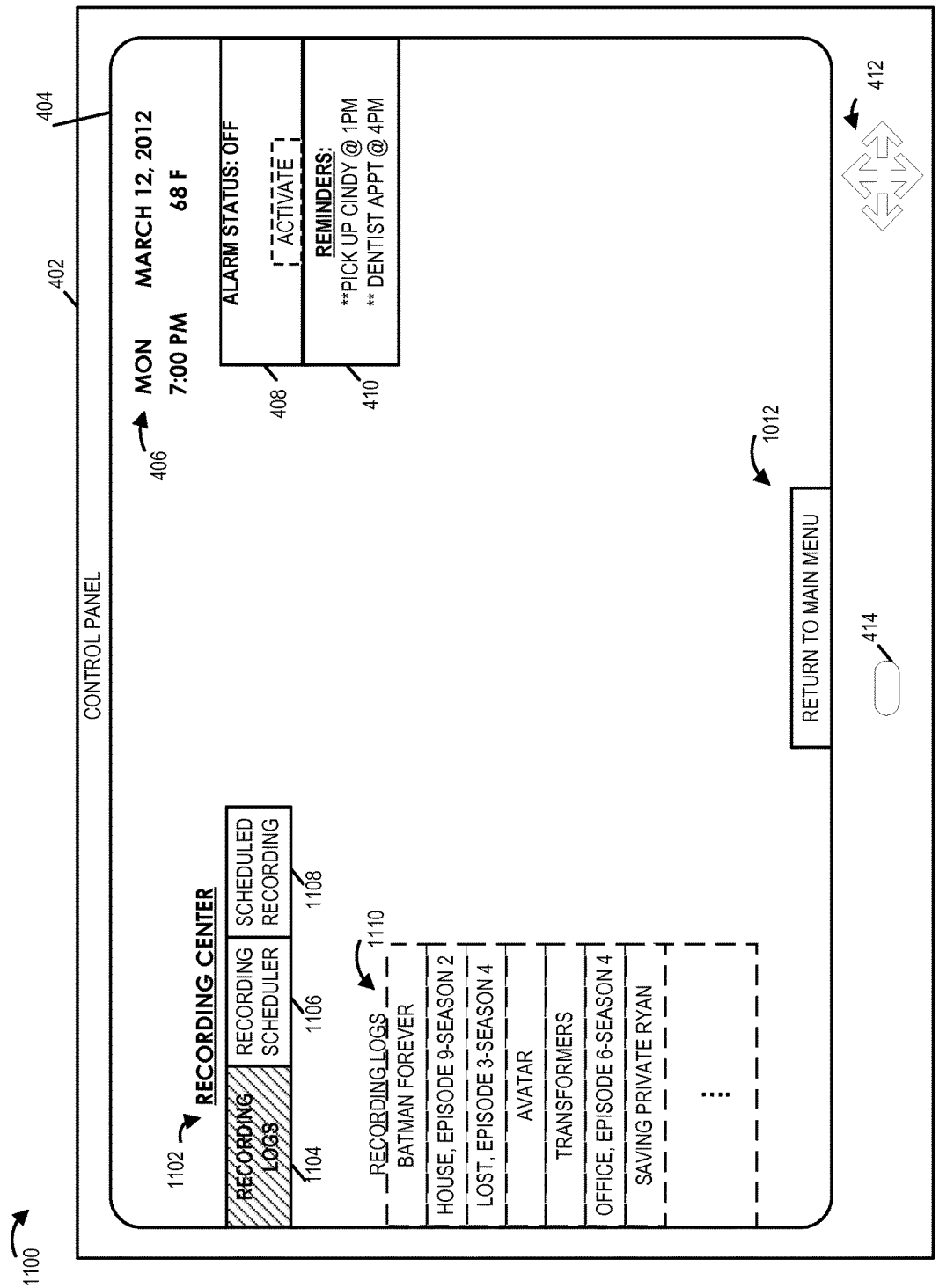

FIG. 11 is a drawing 1100 showing the display screen 404 of control panel 402 showing various fields which are displayed following selection of the RECORDING CENTER field 426 from the main menu 420 on the control panel 402 discussed in FIG. 4. Section 1102 shows the options normally presented to the user following the selection of the RECORDING CENTER field 426 from the main menu 420. The displayed RECORDING CENTER 1002 includes a recording logs field 1104, a recording scheduler field 1106 and a scheduled recordings field 1108. The user can tap on any one of the sections to view the details and take further action. For discussion purposes consider that the user has selected to view recording logs field 1104 which is highlighted to illustrate the user selection.

Following the selection of recording logs field 1104, a recordings log 1110 is presented to the user. The recordings logs 1110 shows a list of items which are currently recorded on the video recording device, e.g., STB, at the customer premise. The user can select any of the recorded items from the recordings log 1110. In some embodiments the user selection will trigger sending of a control signal from the control panel 402 to the STB to start playback of the selected item.

Figure 12:
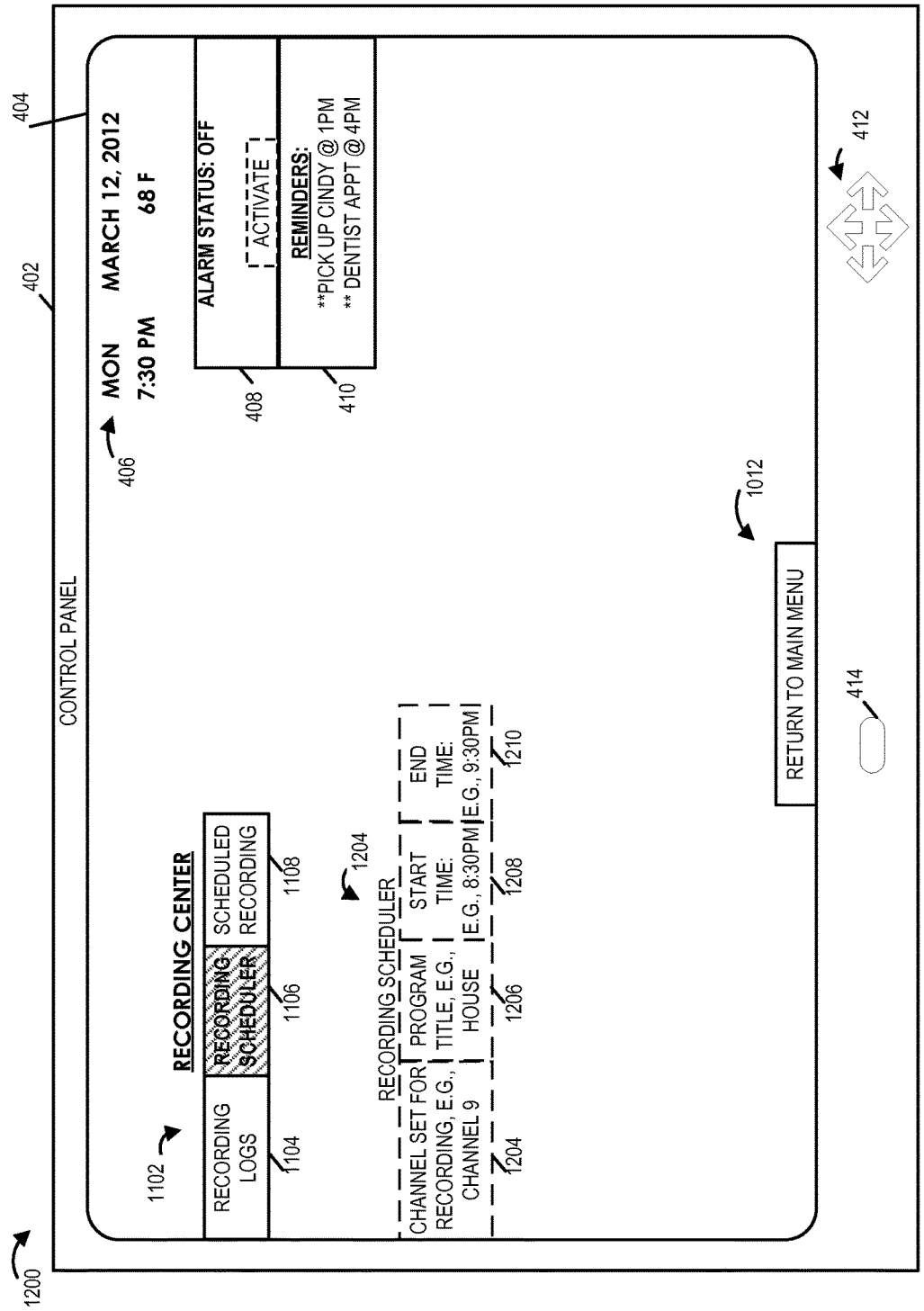

FIG. 12 is a drawing 1200 showing the display screen 404 of control panel 402 showing various fields which are displayed following selection of the RECORDING CENTER field 426 from the main menu 420 on the control panel 402. FIG. 12 example shows the screen display at a point in time when the user selects the recording scheduler field 1106 highlighted to illustrate the user selection, from the options available in the recording center section 1102 discussed above.

Following the selection of recording scheduler field 1106, a recording scheduler 1204 is presented to the user which provides an option to browse and select or enter a channel for recording as indicated in field 1204, an option to enter the title of the program to be recorded if the user wishes to name it differently than the default/original tile as indicated in field 1206, an option to set the start time of recording of a corresponding program as indicated in field 1208, and an option to enter the end time to end the recording of a corresponding program as indicated in field 1210.

Figure 13:
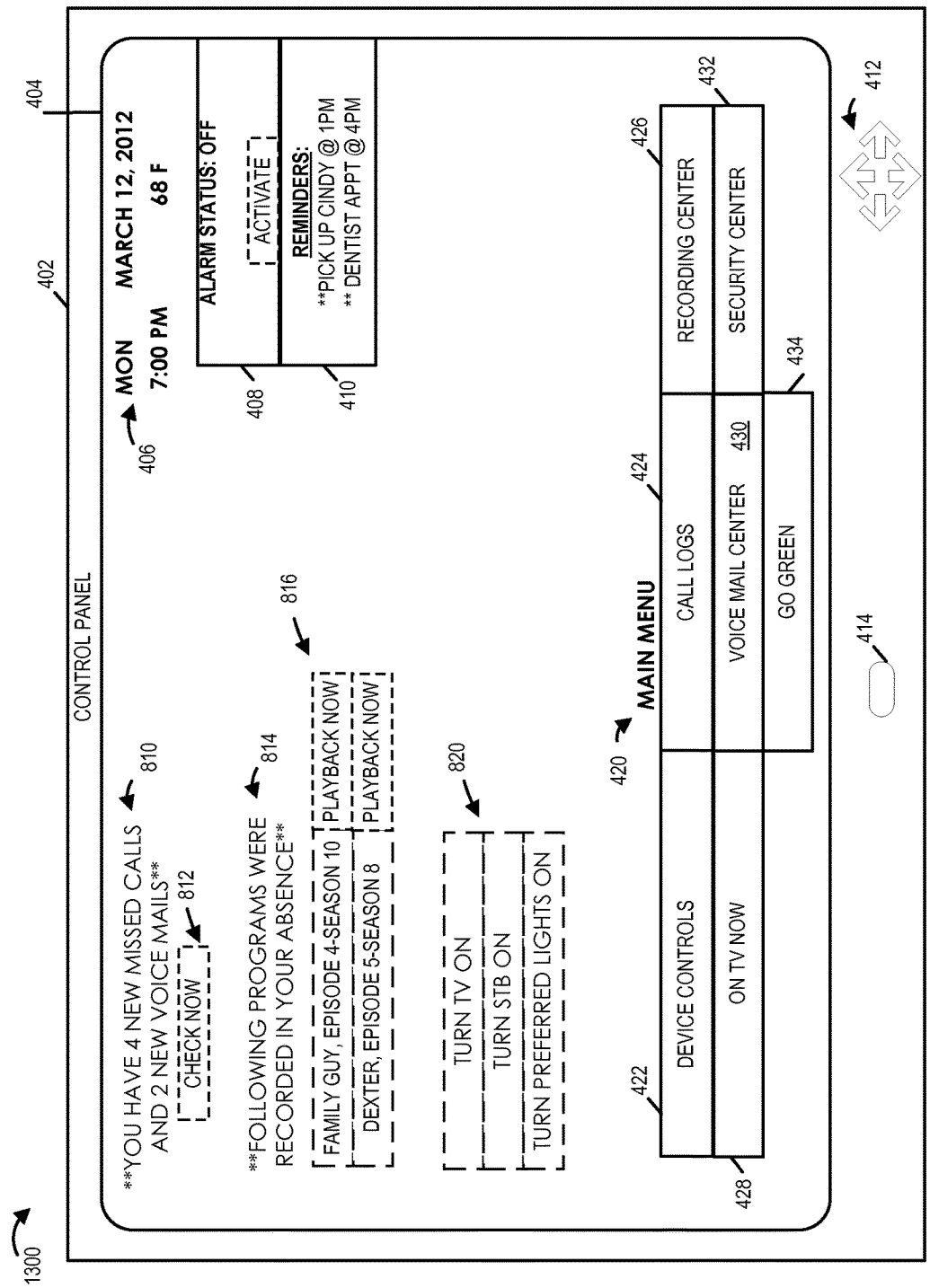

FIG. 13 is a drawing 1300 of the exemplary control panel 402 including the screen 404 showing various fields which are displayed following selection of the simple alarm deactivation option 710. Thus FIG. 13 presents an example of a screen display which is an alternative of the screen display illustrated in FIG. 8 example. It should be appreciated that same reference numbers have been used for the displayed items which have been discussed earlier in the FIG. 8 example. Field 408 shows that the alarm is now off and provides the user a chance to activate the alarm should the user so desires. The reminders are shown in field 410. As discussed with regard to FIG. 8 example, following alarm deactivation and retrieval of recording information the user is provided a list of recordings that were made since the alarm was activated as indicted by the fields 814 and 816. The missed call and voice mails information is also provided as shown. In addition to the information shown and discussed with regard to FIG. 8, in FIG. 13 it is illustrated that following alarm deactivation an opportunity is provided to the user to individually control various devices, e.g., TV, STB, Lights, fans etc., using the control options presented in section 820. Since the user selected the simple alarm deactivation option 710 (rather than the multi-function alarm deactivation option 712), the control options presented in section 820 provides an opportunity to the user to control, e.g., turn on, play etc., one or more devices individually if the user desires.

Figure 14:
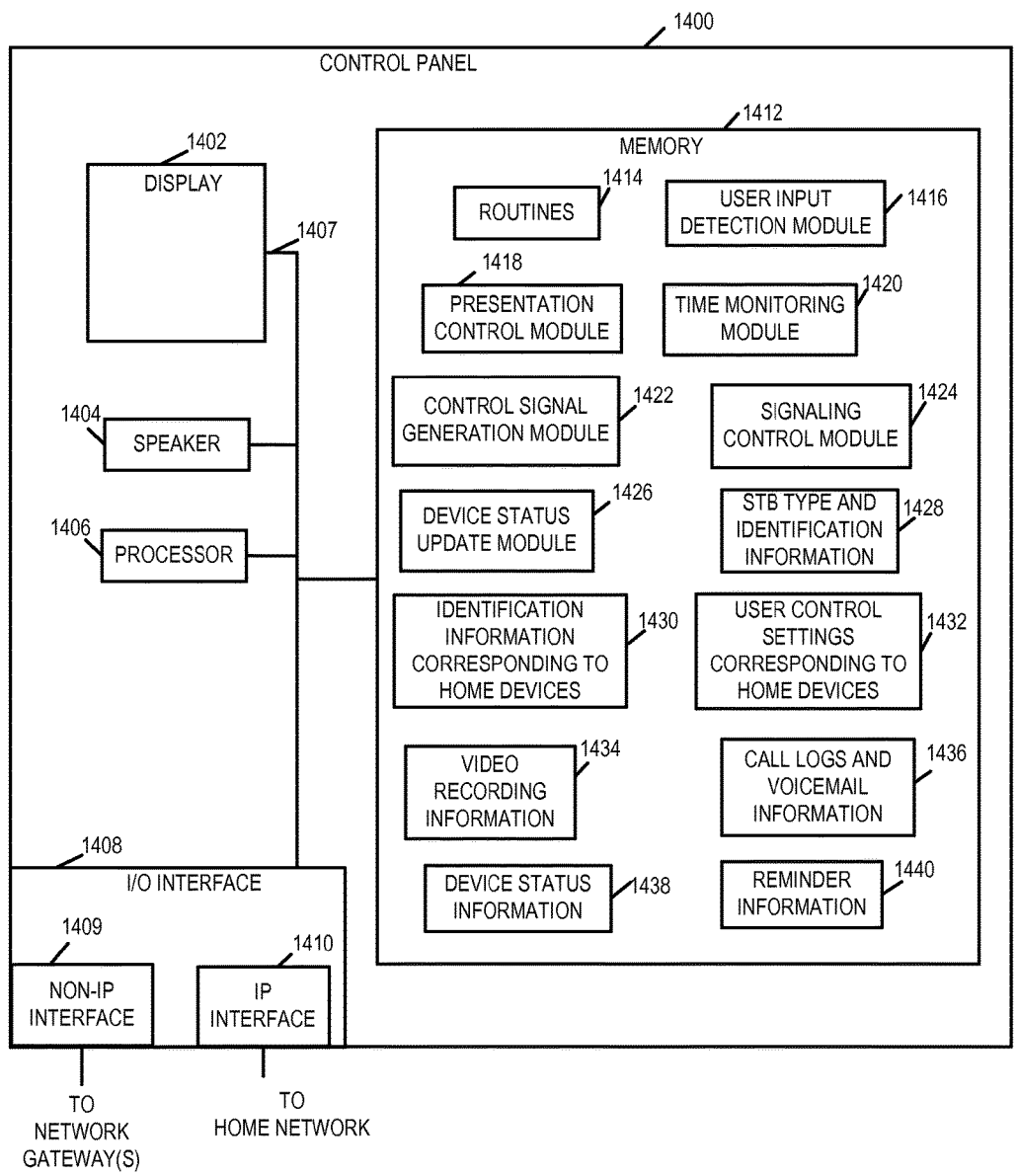
FIG. 14 illustrates an exemplary control panel in accordance with some embodiments of the invention.

FIG. 14 illustrates an exemplary control panel 1400 implemented in accordance with one exemplary embodiment. The control panel 1400 may be used as the control panel 120 of the system 100 and control panel 402 illustrated in FIGS. 4-13. As shown, the control panel 1400 includes a display 1402, a speaker 1404, a processor 1406, an Input/Output (I/O) interface 1408, and a storage device, e.g. a memory 1412 coupled together via a bus 1407. The various elements of the control panel 1400 can exchange data and information over the bus 1407.

Via the I/O interface 1408, the control panel 1400 can exchange signals and/or information with other devices and/or system elements such as the servers in the network head end 102, e.g., via one or more gateway devices and with various home devices such as the alarm system. The I/O interface 1002 supports the receipt and/or transmission of information from/to various different servers and/or devices. The I/O interface 1002 in various embodiments includes an IP interface 1410 that supports communication of information over IP and a non-IP interface 1409 that supports communication of information over non-IP communications media.

The speaker 1404 provides an audio output to the user. In some embodiments the user can configure the control panel 1400 such that it provides audible messages, alerts, reminders to the user upon detecting selection of a selectable control option. For example in some embodiments, upon detecting selection of an alarm activation control option, the control panel 1400 provides an audible message via the speaker 1404 presenting an opportunity to preserve an item scheduled to be deleted and/or record an item for later viewing, depending on the preference of the user. Such an audio message may be in addition to the messages and prompts displayed on the display screen 1402.

The processor 1406, e.g., a CPU, executes routines 1414 and one or more modules to control the control panel 1400 to operate in accordance with the invention. The processor 1406 is responsible for general operation of the control panel 1400 including, e.g., presentation of information for display. To control the control panel 1400, the processor 1406 uses information, various modules and/or routines including instructions stored in memory 1412.

In addition to the routines, the memory 1012 includes a user input detection module 1416, an option presentation control module 1418, a time monitoring module 1420, a control signal generation module 1422, a signaling control module 1424, a device status update module 1426, STB type and identification information 1428, identification information corresponding to other home devices 1430, video recording information 1432, user control settings corresponding to home devices 1434, call logs and voicemail information 1436, device status information 1438, and reminder information 1440.

Routines 1414 include communications routines and/or control routines. User input detection module 1416 is configured to monitor for user inputs and detect a user input, e.g., user selection of a control option. User selectable control options presented on the control panel screen may be selected by tapping on the control option in embodiments where the control panel display 1402 supports touch screen functionality. In other embodiments the selectable control options can be selected by the user by using scroll keys and selection button provided on the control panel 1400. The user input detection module 1418 determines, on selection of a control option presented at the control panel, what type of control option has been selected by the user, e.g., an alarm activation control option, deactivation control option, selection of an item from the menu etc.

The presentation control module 1418, in some embodiments, controls presentation of prompts, specific messages, user selectable control options, menu items, etc., at the control panel, e.g., on the user display screen 1402. In some scenarios the presentation of prompts, messages, control options is in response to detecting a user input, e.g., selection of a first selectable control option by the user, in accordance with the invention.

The time monitoring module 1420 controls a time counter to record time elapsed since the receipt of a user input at the control panel. The time monitoring module 1420 controls start, stop and reset operation of the time counter in accordance with the methods of the invention. For example, the time monitoring module 1420 controls the time counter to start when user selection of alarm activation control option is detected and records the time elapsed. When the user again selects a control option from one or more control options which are presented at the control panel following the selection of alarm activation control option in accordance with the invention as discussed earlier, e.g., to preserve an item from being deleted, the time monitoring module 1420 resets the time counter and restarts it. The time counter expires when no user input is detected for a predetermined amount of time, e.g., 60 seconds, from the start of the time counter. Upon expiration of the time counter, the time monitoring module 1420 provides an input signal to the signaling control module 1424 indicating that alarm should be activated. In response to receiving the input from the time monitoring module 1420 the signaling control module 1424 control communication of an alarm activation control signal from the control panel 1400 to the home control server 118.

Control signal generation module 1422 generates various control signals, e.g., alarm activation/deactivation control signal, video recording information request signal, recording preservation control signal, a control signal to record a selected item, control signals for controlling various home devices, e.g., STBs, TVs, fans, lights etc. Thus the control signal generation module 1422 generates various control signals which are communicated to one or more servers and/or devices in accordance with the invention. Some such control signals are shown in FIGS. 2 and 3, for example signals such as 205, 205', 225, 225', 241, 253, 257, 269, 273, 283 shown in FIG. 2 and other similar control signals shown in FIG. 3. In various embodiments the control signal generation module 1422, among other things, is configured to generate a request signal, in response to detection of a user selection of a user selectable control option presented to a user on the control panel, video recording information corresponding to a video recording device.

Signaling control module 1424 control when a control signal generated at the control panel is communicated and what signaling format should be used for communicating a control signal. For example in case of IP capable set top box embodiment, the control signals can be communicated over IP, thus in such embodiments the signaling control module 1424 ensures that a control signal being sent out over IP is in a suitable format. When a format conversion and/or encapsulation is needed for a control message to be communicated over IP, the signaling control module 1424 provides such an encapsulations and/or format conversions. Device status update module 1426 keeps track of the current status of various devices at the customer premise and updates the status of each home device at the control panel whenever a change in a device's status occurs. For example, the device status update module 1426 updates the status of home alarm so that it is correctly displayed on the control panel display after activation and deactivation.

The STB type and identification information 1428 includes information regarding each STB device operating at the customer premise which can be controlled using the control panel 1400. The type information indicates, for each STB, whether the STB is an IP capable set top box or an old legacy STB that does not support IP. The device identification information includes an identifier/address corresponding to each STB. The identifier maybe a unique device identifier, a MAC address, or an IP address corresponding to the STB device.

The identification information corresponding to home devices 1430 includes identification information corresponding to each of the home devices that can be controlled using the control panel 1400. The identification information for each device may include a device identifier, a MAC address, or an IP address corresponding to each of the devices.

User control settings corresponding to home devices 1432 include default user settings for controlling various home devices. For example information 1432 includes settings regarding which of the devices the user wants to be turned off upon activation home alarm. The devices to be turned OFF may include, e.g., lights, fans, TV, music system, or any other device that the user may like to add. User control settings corresponding to home devices 1432 further includes settings regarding what devices should be turned ON when alarm deactivation occurs. The user may even store the preferred settings regarding light/fan intensity so that these devices operate as per the user's desire when turned ON.

Video recording information 1434 includes recording information received from a video recording device at the customer premise, e.g., a STB, and includes programs scheduled to be deleted, suggested upcoming programs which may be recorded, various programs recorded in user's absence. In case of the STBs that do not support communication over IP the video recording information is received by the control panel 1400 via one or more gateways and servers while in the IP capable STB embodiments the video recording information is received over IP. In various embodiments the control panel uses the received video recording information 1434 to generate video recording device control options for presentation to the user as discussed in FIGS. 2, 3, 5, 6 and 8. In various embodiments the video recording device control options are presented to the user in response to detecting user selection of a control option at the control panel, e.g., such as an alarm activation/deactivation control option, and/or a control option from the main menu to show recording information.

Call logs and voicemail information 1436 includes recent call logs including missed, dialed and received calls and any voicemails retrieved by the control panel 1400 for presenting to the user. Device status information 1438 includes a list of home devices and their corresponding operational status. Reminder information 1440 includes details regarding reminders set by the user. The reminder information is used by the presentation control module 1418 to present reminders to the user on the control panel 1400. The reminder may be presented both in a visual message form displayed on the display 1402 and in an audible message form.

In some embodiments one or more of the above discussed modules work under the control of the processor to perform the functions in accordance with the invention. In some embodiments, one or more of the various modules discussed above work in coordination, e.g., with operations being merged to perform a function, to produce a desired output in accordance with the exemplary methods of the invention.

While shown in the context of recording and voice mail functions, it should be appreciated that the control panel can be used to control a variety of other devices and allow a user access to a host of information including home temperature logs, power outage logs, E-mail, etc. when returning home or when leaving.

Numerous additional features are possible and supported in various embodiments.

Set top box functions can be controlled via control panel 120 which can send via the network gateway 110 and video server gateway 116 signals which can be received and processed by the cable network system, e.g., set top boxes 122 and 122' at the customer premise where the control panel 120 is located.

In at least some embodiments the signals used to control the set top boxes 122, 122' are transmitted from the network headend to the set top boxes 122, 122' via the cable network. In other embodiments where the set top boxes can be communicated with via the home network, control signals can and are sent from the control panel 120 to the set top boxes via the home network. Thus, set top boxes 122, 122' can be controlled from the control panel 120 even if the control panel 120 can not directly interface with the set top boxes via the home network 133.

Among the set top box functions which can be controlled via the control panel 120 are the following: video, voice or data services upon can be enabled/disabled automatically by the control panel based on an Alarm state, specific time range, a specific event, etc. detected by the home alarm system or sensors and reported to the control panel which can then trigger, e.g., either alone or under direction of the home control sever, home owner specified action to be action to be taken. The control panel 120 can also be used to disable any/all set top boxes completely with the disable signals being sent to the set top boxes when such action is to be taken in response to a signal from the control panel or directly from the control panel. Similarly the control panel can be used to disable VOD/PPV one or more purchases, e.g., make at set top boxes 122 or 122' via signals sent to the cable network headend from the control panel 120. The control panel can also be used to restrict tunable channels on any/all/set tops and/or restrict digital phone emergency/specific number list dial out services by the control panel sending control signals to the network headend and/or home control server 118. The control panel 120 can also be used to activate one or more applications that restrict, web pages, PC usage, etc. by restricting access via control signals sent to the network gateway 110 and/or sending signals to disable or control devices such as personal commuters within the home.

The control panel 120 and/or home control server 118 can and in some embodiments is, used to trigger the sending of notifications of events in video, voice, or data services based on a home alarm state being detected, or in general on the "IH UI" device(s), e.g., by sending a notification message over the home network or via the network gateway to cause the notification to be provided to a customer, e.g., via a telephone, video or E-mail service.

The control panel 120 can be used as an input device which sends a control signal to a STB, potentially including DVR capability, to either directly via the home network or through the cable network system to: control a set to box to tune to a channel specified by a user of the control panel, control a DVR at the customer premise to Start, End, error, conflict, etc. of DVR recording event, enable and/or disable Parental Control block at a STB, and/or control the playback of recorded content via a set top box.

The home control server 118 and/or control panel 120 can, and in some embodiments do, send signals to the cable network headend to cause information relating to events that are detected and/or controlled by the home control server to be displayed on a display device corresponding to a set top box at the customer premise where a notification is to be sent. Notifications of events, e.g., Intelligent Home events on set top boxes, can include one or more notifications relating to any of the following: alarms based on rules, arming/disarming of the home alarm system, information about execution of an established rule, notification of a medical event, notification of a thermostat setting or detected temperature condition and/or information relating to light on/off control.

The home control server 118 and/or control panel 120 may trigger various events in response to one or more conditions being sensed, e.g., detection of the presence of a user starts one or more "welcome home" profile actions including one or more of the following: unlock door, turn on lights, turn TV on and set a TV to a predetermined channel, playback voicemails, automatically log a user on to one or more devices or websites if presence of a keyfob corresponding to the user is detected, set channel listing and/or blocked channels on set top boxes based on the identity of the user detected by the control panel or other sensor.

Set top boxes 122, 122' can be used to send signals to control the home control system/alarm to perform one or more of the following operations: Arm/Disarm the alarm system, retrieve a camera view from the alarm system, control thermostats, lights, door locks, and/or the position of door or window coverings or door/window positions.

Methods and apparatus for controlling a home alarm and supporting various control functions including STB recording functions are described. In some embodiments, e.g., where the STB is a DOCSIS capable device, communications between the control panel and STB is through a gateway and/or server which perform protocol conversions and/or other functions which allow the IP based control panel to interact with the STB via a communications network and other devices located external to the customer premise, e.g., home, where the control panel and alarm are located. In embodiments where the STB is an IP capable device, communication between the control panel and STB is via a home network. In some embodiments upon selecting an alarm activation option a user is provided an opportunity to select recordings, which are scheduled for deletion, to be preserved. The user may also be presented with suggestions for program recordings from which the user may select before the alarm is activated. Upon alarm deactivation, a user is presented in some embodiments with a list of recordings made while the user was away from home and missed call log information. Alarm activation and deactivation may be tied to light, TV and/or other home appliances so that they are automatically activated/deactivated in response to user selection of an alarm activation or deactivation option.

At least some embodiments are directed to exemplary method of controlling multiple devices located at a customer premise in accordance with some embodiments comprises: presenting at a control panel used to control a customer premise alarm system, a first user selectable control option; requesting (e.g., by sending a request signal from the control panel), in response to detecting user selection of said first user selectable control option, video recording information corresponding to a video recording device; and presenting, at said control panel, a video recording device control option to a user of said control panel.

In some embodiments the first user selectable control option is one of an alarm activation option or an alarm deactivation option.

In some embodiments where the first user selectable control option is an alarm activation option, the step of presenting a video recording device control option includes: presenting said user at least one of: a list of programs scheduled to be deleted from which the user can select one or more programs for preservation, or a list of suggested programs; monitoring to detect user selection of a program from the list of programs scheduled to be deleted; and in response to detecting user selection of a program scheduled to be deleted, sending a control message used to indicate that said video recording device should preserve the selected program.

In some embodiments the control message is an IP based message transmitted over a home network located at said customer premise when said video recording device, e.g., set top box (STB), is an IP capable device.

In some embodiments the control message is transmitted to a server which is coupled to said digital video recording device via a communications network that is external to said customer premise when the digital video recording device, e.g., the STB, is not an IP capable device.

In some embodiments the digital recording device is a set top box capable of recording programming content; and the communications network is one of a cable network or a satellite network.

In various embodiments the method further comprises sending an alarm activation control signal to a control server to activate said alarm. In some embodiments the control server is located external to said customer premise.

In various embodiments the method further comprises sending a light switch control signal to the control server to turn off lights in said customer premise. In some embodiments the light control signal to turn off the lights may be part of a message sent to the control server which also includes a part used to instruct the control server to turn on the alarm. In some embodiments the signal may identify the customer premise and/or controller so the control server can respond with the appropriate control information which is then sent by the controller over the home network to the alarm and light controller.

In some embodiments the alarm activation control signal and the light control signal are sent, after a predetermined time elapses without receiving user input at the control panel, from the control panel following selection of said alarm activation option. In accordance with one feature of some embodiments, selection of the alarm activation option starts a countdown timer, e.g., providing the user an opportunity to leave the house before the alarm is active. Each time the user selects a video control or other option, the start of the countdown timer is reset so the countdown to when the alarm becomes active runs from the last input of the user following selection of the activation option. This gives the user time to make video recording selection and control options without worry of setting off the alarm when leaving the house.

An exemplary control panel capable of controlling multiple devices located at a customer premise, comprises: a presentation control module configured to present a first user selectable control option, said; a control signal generation module configured to generate a request, in response to detecting user selection of said first user selectable control option, for video recording information corresponding to a video recording device; and an interface configured to send the request for video recording information. In various embodiments the presentation control module is further configured to present, at said control panel, a video recording device control option to a user of said control panel. In some embodiments the first user selectable control option is one of an alarm activation option or an alarm deactivation option.

In some embodiments the first user selectable control option is an alarm activation option. In some embodiments the presentation control module is further configured to present to said user at least one of: a list of programs scheduled to be deleted from which the user can select one or more programs for preservation, or a list of suggested programs, as part of being configured to present a video recording device control option. In some embodiments the control panel further includes an input detection module configured to detect user selection of a program from the list of programs scheduled to be deleted. In some embodiments the control signal generation module is further configured to generate, in response to said input detection module detecting user selection of said program scheduled to be deleted, a control message instructing that said video recording device should preserve the selected program. In some embodiments the interface is further configured to send said control message instructing that said video recording device should preserve the selected program to said video recording device.

In some embodiments the control message is an IP based message transmitted over a home network located at said customer premise when said video recording device is an IP capable device. In some embodiments the control message is transmitted to a server which is coupled to said video recording device via a communications network that is external to said customer premise when said digital video recording device is not an IP capable device.

In some embodiments the recording device is a set top box capable of recording programming content; and the communications network is one of a cable network or a satellite network.

In some embodiments the control signal generation module is further configured to generate an alarm activation control signal, and the interface is further configured to send the alarm activation control signal to a control server to activate an alarm.

Various features and embodiments are also directed to a system and/or apparatus for performing one or more of the steps described with regard to the exemplary method(s). For example, some features are directed to a control panel while other features are directed to gateway apparatus and/or server(s) located at a network headend or other location external to a customer premise location where the control panel and/or alarm are located.

Many of the above described methods or method steps can be implemented using machine, e.g., computer, executable instructions, such as software, included in a non-transitory machine, e.g., computer, readable medium used to control a machine, e.g., general purpose computer with or without additional hardware, to implement all or portions of the above described methods, e.g., in one or more nodes. The machine readable medium may be, e.g., a memory device, e.g., RAM, floppy disk, etc. Accordingly, among other things, the present invention is directed to a machine-readable medium including machine executable instructions for causing a machine, e.g., processor and associated hardware, to perform one or more of the steps of the above-described method(s).

Numerous additional embodiments, within the scope of the present invention, will be apparent to those of ordinary skill in the art in view of the above description and the claims which follow.

What is claimed is:

1. A method of using an alarm system control panel located at a customer premise, the method comprising:
   detecting, at said alarm system control panel, user selection of a first user selectable control option, wherein said first user selectable control option is displayed on a display screen of said alarm system control panel, said first user selectable control option being one of an alarm activation control option or an alarm de-activation control option;
   requesting, in response to said detecting user selection of said first user selectable control option, video recording information corresponding to a recording device; and
   presenting at said alarm system control panel, following receipt of said video recording information, a recording device control option to a user of said alarm system control panel.

2. The method of claim 1,
   wherein requesting, in response to said detecting user selection of said first user selectable control option, video recording information corresponding to a recording device includes:
   sending a request signal from the alarm system control panel to a digital video recorder requesting video recording information corresponding to a recorder; and
   wherein the method further comprises, following sending of the request signal and presenting at said alarm system control panel, following receipt of said recording information, the recording device control option to the user of said alarm system control panel:
      detecting user selection of a program scheduled to be deleted; and
      sending, in response to detecting user selection of a program scheduled to be deleted, a control message used to indicate that said recording device should preserve the selected program.

3. The method of claim 2, wherein said control message is an IP based message transmitted over a home network located at said customer premise when said recording device is an IP capable device.

4. The method of claim 2, wherein said control message is transmitted to a server which is coupled to said recording device via a communications network that is external to said customer premise when said recording device is not an IP capable device.

5. The method of claim 4, wherein said recording device is a set top box capable of recording programming content; and
wherein said communications network is one of a cable network or a satellite network.

6. The method of claim 1,
wherein said alarm system control panel is coupled to a set top box which is coupled to a television; and
wherein the method further comprises:
operating the alarm system control panel to control the set top box based on user input received at said alarm system control panel.

7. The method of claim 6, further comprising:
operating the alarm system control panel to send a command to the television to control the television to turn on.

8. The method of claim 1, wherein detecting, at said alarm system control panel, user selection of a first user selectable control option includes:
operating a touch screen, which is part of said alarm system control panel and which is used to display the first user selectable control option to perform said detecting.

9. A method of using an alarm system control panel located at a customer premise, the method comprising:
detecting, at said alarm system control panel, user selection of a first user selectable control option;
requesting, in response to said detecting user selection of said first user selectable control option, video recording information corresponding to a recording device;
presenting, at said alarm system control panel, following receipt of said video recording information, a recording device control option to a user of said alarm system control panel, wherein said step of presenting a recording device control option includes presenting said user at least one of: a list of programs scheduled to be deleted from which the user can select one or more programs for preservation or a list of suggested programs which may be recorded;
monitoring to detect user selection of a program from the list of programs scheduled to be deleted or a program from the list of suggested programs which may be recorded; and
activating an alarm after failing to detect a user selection of a program in a predetermined time period.

10. The method of claim 9, wherein presenting said user at least one of: a list of programs scheduled to be deleted from which the user can select one or more programs for preservation or a list of suggested programs which may be recorded includes: presenting said user a list of programs including an upcoming program which may be recorded; and
wherein the method further comprises:
detecting user selection of a program from the list of suggested programs which may be recorded; and
sending, in response to detecting user selection of a program from the list of suggested programs, a control message used to indicate that said recording device should record the selected program.

11. The method of claim 9, wherein said alarm system control panel is used for controlling a home alarm, the method further comprising:
sending an alarm activation control signal to a control server to activate said home alarm.

12. The method of claim 11, wherein said control server is located external to said customer premise.

13. The method of claim 9, further comprising:
sending a light switch control signal to a control server to turn off lights in said customer premise; and
wherein said light switch control signal is sent, after a predetermined time elapses without receiving user input at said alarm system control panel, from said alarm system control panel following selection of said first user selectable control option.

14. An alarm system control panel located at a customer premise, comprising:
an input detection module configured to detect user selection of a first user selectable control option, said first user selectable control option being one of an alarm activation option or an alarm de-activation option;
a control signal generation module configured to generate a request, in response to said input detection module detecting user selection of said first user selectable control option, for video recording information corresponding to a recording device;
an interface configured to send said request for recording information; and
a presentation control module configured to present, following receipt of said video recording information at said alarm system control panel, a recording device control option to a user of said control panel.

15. The alarm system control panel of claim 14,
wherein said presentation control module is further configured to present said user at least one of: a list of programs scheduled to be deleted from which the user can select one or more programs for preservation or a list of suggested programs which may be recorded;
wherein said input detection module is further configured to detect user selection of a program from the list of programs scheduled to be deleted or a program from the list of suggested programs which may be recorded; and
wherein said interface is further configured to send an alarm activation signal to activate an alarm, said alarm being activated after an action is taken based on a detected user selection or after failing to detect a user selection in a predetermined time period.

16. The alarm system control panel of claim 15,
wherein said control signal generation module is further configured to generate a light switch control signal; and
wherein said interface is further configured to send said light switch control signal to a control server to turn off lights in said customer premise.

17. The alarm system control panel of claim 15,
wherein said control signal generation module is further configured to generate, in response to said input detection module detecting user selection of a program scheduled to be deleted, a control message instructing that said recording device should preserve the selected program.

18. The alarm system control panel of claim 17, wherein said control message is an IP based message transmitted over a home network located at said customer premise when said recording device is an IP capable device.

19. The alarm system control panel of claim 15,
wherein said control signal generation module is further configured to generate, in response to said input detection module detecting user selection of a program from the list of suggested programs which may be recorded, a control message instructing that said recording device should record the selected program.

* * * * *